United States Patent
Marashdeh et al.

(10) Patent No.: US 12,278,018 B1
(45) Date of Patent: Apr. 15, 2025

(54) GAMMA RADIATION SHIELDING MATERIALS INCORPORATING NEODYMIUM-DOPED ZIRCONIA NANOPARTICLES AND METHODS FOR PREPARATION THEREOF

(71) Applicant: IMAM MOHAMMAD IBN SAUD ISLAMIC UNIVERSITY, Riyadh (SA)

(72) Inventors: Mohammad Wasef Marashdeh, Riyadh (SA); Islam Gamal Ibrahim Ali Alhindawy, Cairo (EG); Karem Abdelazim Gaber Mahmoud, Dammam (SA); Hanan Fawaz Akhdar, Riyadh (SA); Nawal Ahmad Madkhali, Riyadh (SA)

(73) Assignee: IMAM MOHAMMAD IBN SAUD ISLAMIC UNIVERSITY, Riyadh (SA)

(*) Notice: Subject to any disclaimer, the term of this patent is extended or adjusted under 35 U.S.C. 154(b) by 0 days.

(21) Appl. No.: 18/951,388

(22) Filed: Nov. 18, 2024

(51) Int. Cl.
  *G21F 1/08* (2006.01)
  *C01G 25/02* (2006.01)
  *C08K 3/22* (2006.01)

(52) U.S. Cl.
  CPC .............. *G21F 1/08* (2013.01); *C01G 25/02* (2013.01); *C08K 3/22* (2013.01); *C01P 2002/54* (2013.01); *C01P 2002/72* (2013.01); *C01P 2002/76* (2013.01); *C01P 2002/77* (2013.01); *C01P 2002/85* (2013.01); *C01P 2004/03* (2013.01); *C01P 2004/04* (2013.01);
  (Continued)

(58) Field of Classification Search
  CPC ........................................................ G21F 1/08
  See application file for complete search history.

(56) References Cited

U.S. PATENT DOCUMENTS

| | | |
|---|---|---|
| 2006/0086928 A1 | 4/2006 | Chonan et al. |
| 2010/0136743 A1 | 6/2010 | Akimoto et al. |
| 2019/0002708 A1 | 1/2019 | Tsunematsu et al. |

FOREIGN PATENT DOCUMENTS

| | | |
|---|---|---|
| CN | 111925732 B | 9/2021 |
| WO | 2023174160 A1 | 9/2023 |

OTHER PUBLICATIONS

Keerthana et al. Nd doped ZrO2 photocatalyst for organic pollutants degradation in wastewater, Environmental Technology and Innovation, 28, 2022, 102851. (Year: 2022).*

(Continued)

*Primary Examiner* — Peter F Godenschwager
(74) *Attorney, Agent, or Firm* — Oblon, McClelland, Maier & Neustadt, L.L.P.

(57) ABSTRACT

A radiation shielding material for shielding against gamma radiation includes neodymium-doped zirconia nanoparticles in a matrix. The neodymium doped zirconia nanoparticles have a tetragonal crystal structure and an average size between about 25 nm to about 35 nm. The nanoparticles have a neodymium content in the range of about 1.5 mol % to about 3 mol % based on the total molar content of the zirconia nanoparticles. A method for the synthesis of neodymium-doped zirconia nanoparticles is provided. The method includes controlled metamorphosis of zirconia from monoclinic to tetragonal phase which results in a multifunctional shielding material having durability and high radiation absorption efficiency.

20 Claims, 17 Drawing Sheets

(52) U.S. Cl.
CPC .. *C01P 2004/64* (2013.01); *C08K 2003/2244* (2013.01); *C08K 2201/011* (2013.01)

(56) References Cited

OTHER PUBLICATIONS

Trexler et al. Crystal structure and optical properties of erbium- and neodymium-doped zirconia nanoparticles, J. Mater. Res., 25, 3, 2010, 500-509. (Year: 2010).*

Chiranjit Nandi, et al., "Structural Response of Nd-Stabilized Zirconia and Its Composite Under Extreme Conditions of Swift Heavy Ion Irradiation", Journal of Nuclear Materials, vol. 499, Feb. 2018, pp. 216-224.

O. V. Dudnik, et al., "Composite Ceramics for Thermal-Barrier Coatings Produced from Zirconia Doped With Rare Earth Oxides", Powder Metallurgy and Metal Ceramics, vol. 61, Nos. 7-8, Nov. 2022, pp. 441-450.

"High Shear Mixing with Ultrasonics—Hielscher Ultrasonics", usa@hielscher.com, (10 pgs.).

\* cited by examiner

GAMMA RADIATION SHIELDING MATERIALS INCORPORATING NEODYMIUM-DOPED ZIRCONIA NANOPARTICLES AND METHODS FOR PREPARATION THEREOF

BACKGROUND

Technical Field

The present disclosure is directed to radiation shielding material and more particularly, to zirconia nanoparticles doped with neodymium as radiation shield in gamma radiation shielding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Ionizing radiations are widely used in different areas including defense, aerospace, nuclear reactors, medical and industries. Sources of ionizing radiation include natural sources such as the sun, cosmic rays and artificial sources such as nuclear power plants, medical imaging instruments, particle accelerators and the like. Ionizing radiation is widely used, but may cause health hazards to humans and animals even at low radiation exposure. Radiation doses of as low as 50-100 mSv can cause severe health hazards such as radiation syndrome and may result in cancer.

Ionizing radiation may be in form of electromagnetic waves such as gamma rays and X-rays or in form of subatomic particles like alpha, beta and neutrons. Of these, gamma rays have the highest penetration power and can penetrate the human body and the internal organs easily, unlike alpha and beta particles which penetrates only the top and middle layers of skin, thus radiation shielding is necessary to prevent or limit harmful effects of ionizing radiation.

Different materials based on various elements or a mixture of elements including heavy metals are being developed for radiation shielding. Conventional shielding materials like lead are are highly effective in radiation shielding but they are extremely heavy and toxic, making them impractical for portable or weight-sensitive applications. Additionally, traditional heavy metal shields pose environmental and health risks due to their toxicity.

Radiation shielding materials are chosen based on their properties. The selection of radiation shielding materials may be specific to a particular type of radiation. For example, materials based on tungsten, lead are titanium are good barriers against gamma radiation but not as effective against neutron radiation. Low density materials, such as those based on hydrogen, are effective barriers against neutron radiation. A multi-layer barrier may be formed using nanomaterials combined with other shielding materials to shield against a spectrum of radiation. An example of a multi-layer barrier is a polymer doped with metal nanoparticles. Ceramics and boron based compounds integrated into flexible matrix are considered promising candidates to replace lead and lead composite based shielding materials. Many existing shields are effective only within narrow energy ranges and some suffer from phase instability under intense radiation, leading to degradation over time.

Zirconia ($ZrO_2$), a high-performance ceramic material and its role as a viable option for gamma-ray shielding is of interest in radiation shielding. Due to its polymorphic nature, the stabilization of zirconia by doping with materials such as yttrium oxide (yttria), calcium oxide (calcia), or cerium oxide (ceria) is critical to enhance its toughness and durability for various industrial applications. Stabilized zirconia, particularly yttria stabilized zirconia, has been investigated for its high atomic density, which attenuates gamma rays while offering significant advantages in terms of durability, resistance to corrosion, and non-toxicity. However, current advanced shielding materials including those based on zirconia often involve complex manufacturing processes, thereby limiting their scalability and increasing costs.

WO2023174160A1 describes a fiber toughened ceramic material for using in neutron shielding which comprises a ceramic material layer, an interface layer and fibers. The ceramic material layer and interface layer may include a combination of Sc, Y, La, Ce, Pr, Nd, Pm, Sm, Eu, Gd, Tb, Dy, Ho, Er, Tm, Yb, and Lu rare earth elements and the fibers may include any one or a combination of silicon carbide, boron carbide, zirconium carbide, titanium carbide, tantalum carbide, hafnium carbide and the like. However, this material does not have a homogeneous structure and there is no mention of forming a tetragonal crystalline structure in the ceramic.

There is a need for radiation barrier materials which are light weight, have low toxicity and provide multilayer protection against harmful radiation. Effective and improved barriers are needed to provide a safe workplace around radioactive sources. Radiation shielding materials based on nanoparticles or nanoparticle composites may be adopted as efficient shielding materials in this regard.

Accordingly, it is one object of the present disclosure to provide radiation shielding materials that are affordable, multifunctional and are relatively light in weight. Another object of the present disclosure is to provide radiation shielding materials based on nanoparticles that absorbs and scatters harmful gamma radiation and shields against a broad spectrum of gamma radiation energies.

SUMMARY

In an exemplary embodiment, a gamma radiation shielding material is described. The matrix material includes neodymium-doped zirconia nanoparticles, wherein the neodymium-doped zirconia nanoparticles are dispersed within the matrix material. The neodymium-doped zirconia nanoparticles have a tetragonal crystal structure, a neodymium content selected from a range of about 1.5 mol % and about 3.0 mol % of a total molar content of the zirconia nanoparticles, and an average size in a range of about 25 nm to about 35 nm.

In another exemplary embodiment, a radiation shield is described. The radiation shield includes the gamma radiation shielding material and a frame configured to hold the matrix material. The frame and matrix material are configured to attenuate gamma radiation in an energy range of about 0.059 MeV to about 2.506 MeV.

In yet another exemplary embodiment, a process for synthesizing neodymium-doped zirconia nanoparticles having a tetragonal crystal structure for use in gamma radiation shielding is described. The process includes forming a precursor solution by mixing a zirconium oxychloride solution with a neodymium nitrate solution; adding a chelating agent comprising acetylacetone to the precursor solution, wherein the acetylacetone is configured to control hydrolysis in the precursor solution; forming a sol-gel matrix material by adding a polyvinylpyrrolidone powder dissolved in ethanol to the chelated precursor solution; adjusting a pH of the sol-gel matrix material to about 10.5 by adding a quantity of ammonium hydroxide; dispersing a graphene oxide composition into the pH adjusted sol-gel matrix material, wherein the graphene oxide is present in an amount of about 0.5 wt. %, wherein wt. % is based on a total weight of the pH adjusted sol-gel matrix material; performing a hydrothermal treatment at a temperature of about 190° C. for about 24 hours; and forming the neodymium-doped zirconia nanoparticles by calcinating the hydrothermally treated sol-gel matrix material at a temperature selected from a range of about 600° C. to about 950° C.

In yet another exemplary embodiment, a method of shielding against gamma radiation is described. The method includes synthesizing neodymium-doped zirconia nanoparticles, wherein the neodymium-doped zirconia nanoparticles have a tetragonal crystal structure, a neodymium content selected from a range of about 1.5 mol % and about 3.0 mol %, and an average size in a range of about 25 nm to about 35 nm; forming a matrix material comprising the neodymium-doped zirconia nanoparticles, wherein the neodymium-doped zirconia nanoparticles are dispersed within the matrix material; forming a frame configured to hold the calcinated hydrothermally treated sol-gel matrix material; forming a radiation shield by inserting the calcinated hydrothermally treated sol-gel matrix material into the frame; and placing the radiation shield in front of a gamma radiation source to attenuate the gamma radiation in an energy range of about 0.059 MeV to about 2.506 MeV.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
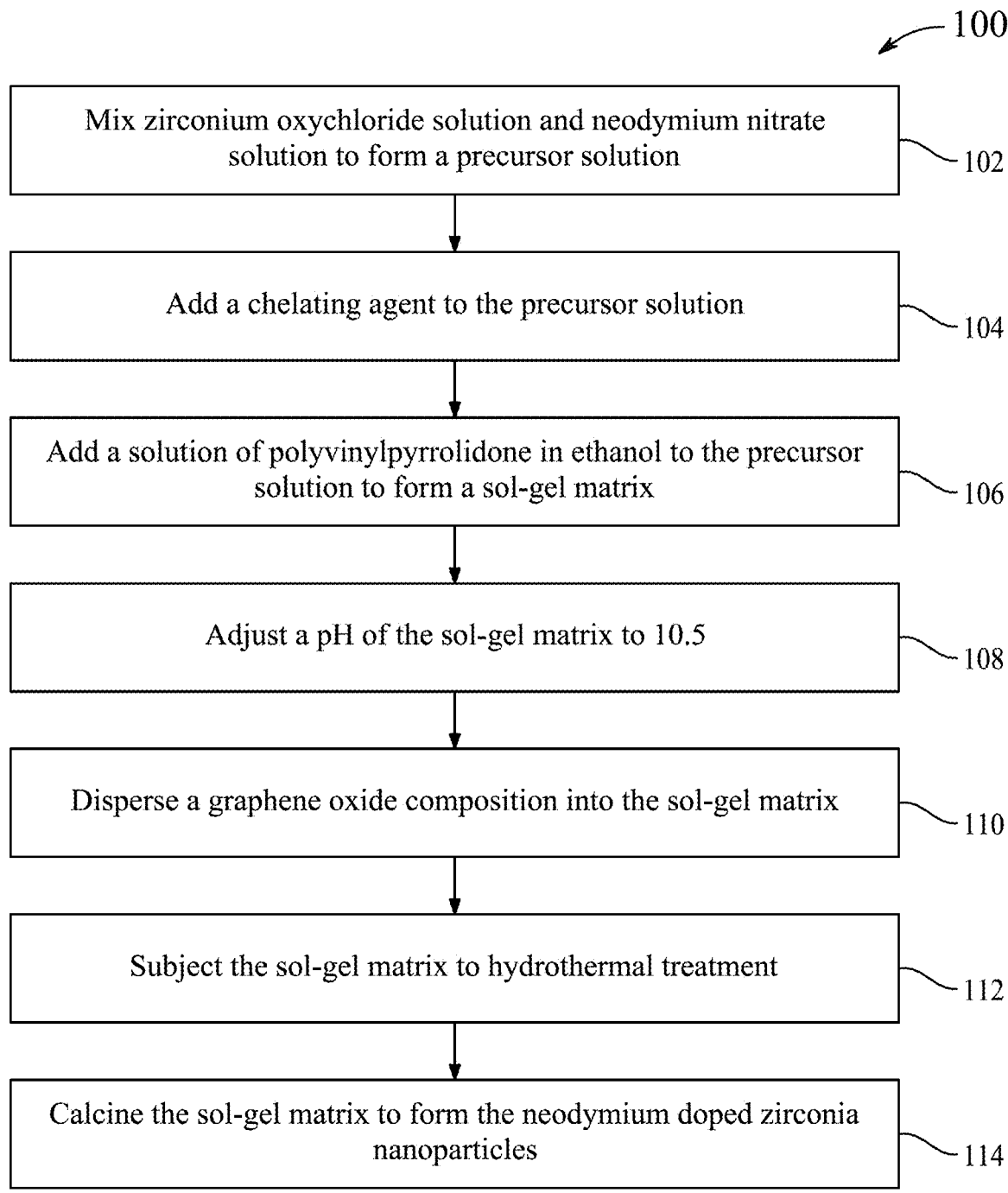
FIG. 1 is a schematic flow chart of a method of making neodymium doped zirconia nanoparticles, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

As used herein, the term "particle size" may be considered the length or longest dimensions of a particle and a pore opening, respectively.

As used herein, the term "mol %" of a component, unless specifically stated to the contrary, is based on the total number of moles in the mixture in which the component is included. Mol % is calculated as the number of moles of an ingredient in the given mixture to the total number of moles of the mixture×100.

As used herein, the term "radiation shielding" refers to placing a barrier between the radiation source and the person or area to be protected from all or certain types of radiations.

Aspects of this disclosure are directed to a radiation shielding material and in particular, to a radiation shield made of zirconia nanoparticles doped with neodymium, which is highly effective in shielding against radiation, particularly gamma radiation. The radiation shielding material includes neodymium doped zirconia nanoparticles dispersed within a matrix prepared by a sol-gel method. The zirconia nanoparticles exhibit a tetragonal crystal structure when doped with neodymium. Further, zirconia, also known as zirconium dioxide ($ZrO_2$), based materials and ceramics have a high fracture toughness and resistance to heat and chemicals.

In an aspect of the present disclosure, zirconia is doped with neodymium (Nd), a lanthanide. Neodymium (Nd) is considered safer as compared to other heavy metals such as lead and titanium and provides an effective radiation shielding. Incorporation of neodymium into the crystal lattice of zirconia results in a change in the crystal structure and morphology of zirconia. This incorporation, in a controlled environment, leads to a phase transformation of zirconia from monoclinic to tetragonal phase. X-ray diffraction (XRD) patterns for neodymium doped zirconia nanoparticles having varying content of neodymium were assessed. The XRD intensity peaks showed a mixture of monoclinic-tetragonal phases of the nanoparticles when the neodymium content was 1.5 mol %. As the content of Nd was increased to 3 mol %, the XRD intensity peaks showed a predominantly tetragonal phase of the zirconia nanoparticles. The tetragonal crystal structure imparts a higher density and better ability to attenuate radiations, thereby enhancing the efficiency of the zirconia particles in shielding the radiations.

According to an aspect of the present disclosure, the neodymium content in zirconia nanoparticles is in a range of about 1.5 mol % to about 3 mol % based on the total molar content of the zirconia nanoparticles. In some aspects, the neodymium content in the zirconia nanoparticles may be any of about 1.6 mol %, 1.7 mol %, 1.8 mol %, 1.9 mol %, 2.0 mol %, 2.1 mol %, 2.2 mol %, 2.3 mol %, 2.4 mol %, 2.5 mol %, 2.6 mol %, 2.7 mol %, 2.8 mol % and 2.9 mol % based on the total molar content of the zirconia nanoparticles. As the doping content of neodymium increases, the density and lattice distortion of zirconia also increases and the size of zirconia crystals decreases. Changes in the crystal structure and size have a positive effect on the resistance of the zirconia nanoparticles to radiation effects. Accordingly, in some aspects, the neodymium content in the zirconia nanoparticles may be in a range of about 2.8 mol % to 3 mol % based on the total molar content of the zirconia nanoparticles. In one aspect, a neodymium content of about 3 mol %, based on the total molar content of the zirconia nanoparticles, is preferred.

The neodymium doped zirconia nanoparticles have an average size in a range of about 25 to 35 nm. In some aspects, the size of the neodymium doped zirconia nanoparticles may range from about 26 nm to about 34 nm, from about 27 nm to about 33 nm, from about 28 nm to about 32 nm, from about 29 nm to about 31 nm. In certain aspects, the neodymium doped zirconia nanoparticles of sizes of about 26 nm to about 28 nm are preferred.

Referring to FIG. 1, a schematic flow chart of a method 100 for synthesizing neodymium-doped zirconia nanoparticles is illustrated, according to an aspect of the present disclosure. The order in which the method 100 is described is not intended to be construed as a limitation, and any number of the described method steps can be combined to implement the method 100. Additionally, individual steps may be removed or skipped from the method 100 without departing from the spirit and scope of the present disclosure.

At step 102, the method 100 includes mixing a zirconium oxychloride solution with a neodymium nitrate solution to form a precursor solution. The molar concentration of zirconium oxychloride in the zirconium oxychloride solution is in the range of 0.1 M to 1 M, including 0.1 M, 0.2 M, 0.3 M, 0.4 M, 0.5 M, 0.6 M, 0.7 M, 0.8 M, 0.9 M, 1.0 M, although a 0.1 M concentration is preferred. In a specific aspect, a 0.1 M zirconium oxychloride solution is prepared and dissolved in about eight molecules of water to form zirconium oxychloride octahydrate ($ZrOCl_2 \cdot 8H_2O$). The molar mass of $8H_2O$ is about 144 grams/mol. The zirconium oxychloride octahydrate ($ZrOCl_2 \cdot 8H_2O$) is mixed with neodymium nitrate hexahydrate ($Nd(NO_3)_3 \cdot 6H_2O$) wherein 0.1 M neodymium nitrate solution is dissolved in about 6 molecules of water to form the neodymium nitrate hexahydrate ($Nd(NO_3)_3 \cdot 6H_2O$). The molar mass of $6H_2O$ is about 108.12 grams/mol. The neodymium content in the neodymium nitrate solution may be in the range of about 1.5 mol % to about 3 mol %.

At step 104, the method 100 includes adding a chelating agent to the precursor solution. A chelating agent is added to control the hydrolysis in the precursor solution. Controlled hydrolysis results in smaller particle sizes and a homogenous particle mixture with respect to the particle size. Suitable chelating agents include acetylacetone, ascorbic acid, citric acid, ethylenediaminetetraacetic acid (EDTA), sodium salt of EDTA, gelatin, β-ketoesters, and the like. In an aspect of the present disclosure, the chelating agent is acetylacetone.

At step 106, the method 100 includes forming a matrix for the radiation shielding material. The matrix may be prepared by sol-gel method wherein a polymer is added to the chelated precursor solution. The polymer is preferably in powder form, although liquid/gel polymers may also be used. In one aspect, the polymer may be selected from a group consisting of polyvinylpyrrolidone (PVP), polyethylene glycol, tetraethoxysilane (TEOS), tetramethoxysilane (TMOS) and the like. The polymer is dissolved in a solvent prior to adding it to the precursor solution. The solvent may be an organic solvent or water. Suitable organic solvents include acetone, dimethyl sulfoxide, dimethylformamide (DMF), nitromethane, propylene carbonate, ethanol, formic acid, n-butanol, methanol, benzene, cyclohexane, ethyl acetate, dichloromethane, toluene, and diethyl ether, or any combination thereof. The water may be tap water, distilled water, deionized water or water filtered by reverse osmosis. In some aspects, the polymer is polyvinylpyrrolidone (PVP) in powder form. In some other aspects, the polyvinylpyrrolidone (PVP) is dissolved in ethanol prior to its addition to the chelated precursor solution.

At step 108, the method 100 incudes adjusting the pH of the sol-gel matrix towards a basic or alkaline value. In an aspect of the present disclosure, the pH of the sol-gel matrix may be in the range of 10 to 11, preferably about 10.5. The sol-gel matrix may initially have a pH below 7 and may require the addition of a base to obtain the higher pH value. The base may be selected from a group consisting of sodium hydroxide, potassium hydroxide, ammonium hydroxide, calcium hydroxide and magnesium hydroxide. In a preferred aspect, the pH of the sol-gel matrix may be adjusted by addition of ammonium hydroxide.

At step 110, the method 100 includes dispersing graphene oxide in the sol-gel matrix. Graphene oxide dispersion accelerates the transition of the matrix to a gel form and also imparts stability to the matrix. The graphene oxide may be added to the matrix in an amount of about 0.2 wt. % to about 0.8 wt. % based on the total weight of the sol-gel matrix. In some aspects, the graphene oxide may be added in an amount of about 0.3 wt. %, about 0.4 wt. %, about 0.5 wt. %, about 0.6 wt. % or about 0.7 wt. % based on the total weight of the sol-gel matrix. In a preferred aspect, graphene oxide may be added in an amount of about 0.5 wt. % based on the total weight of the sol-gel matrix. The dispersion of graphene oxide into the matrix may be carried out by sonication. In one aspect, the graphene oxide is dispersed using an ultrasonic mixer, preferably an ultrasonic high shear mixer. In a non-limiting example, the ultrasonic shear mixer may be the high shear mixer UIP2000hdT, manufactured by Hielscher Ultrasonics GmbH, Teltow, Germany.

At step 112, the method 100 includes subjecting the sol-gel matrix from step 110 to a hydrothermal treatment. The sol-gel matrix is heated under a specific pressure level to obtain a homogenous matrix material. The heating is performed at high temperatures ranging from about 170° C. to about 200° C. In some aspects, the sol-gel matrix is heated at a temperature selected from the group of about 175° C., about 180° C., about 185° C., about 190° C. and about 195° C., although heating the matrix to a temperature of about 190° C. is preferred. The matrix may be heated using an autoclave reactor which may be a polytetrafluoroethylene (PTFE), a Teflon lined autoclave reactor or a polyparaphenol (PPL) lined autoclave. In certain aspects, the matrix may be heated for a period of about 20 to about 24 hours. The heating may be carried out for a period selected from one of about 21 hours, about 22 hours and about 23 hours. In a preferred aspect, the matrix is heated at temperatures of about 190° C. for a period of 24 hours.

The hydrothermally treated sol-gel matrix is subjected to calcination, at step 114, to form the neodymium doped zirconia nanoparticles. The calcination may be carried out by placing the matrix into a calcining device such as a calciner or a rotary kiln. A calciner is a machine that heats materials to high temperatures to change their properties, such as removing moisture or impurities, or altering their chemical structure. Calciners are often used in industrial processes, such as chemical production, metallurgical processes, and mineral treatment. Calciners are typically steel cylinders that rotate inside a heated furnace. They use an indirect heat source to process materials at high temperatures, such as 550-1150° C. within a controlled atmosphere. The calcining device may be equipped with a temperature control system, which may provide high temperatures of about 600° C. to about 950° C. In an aspect, the matrix is calcined at temperatures of about 650° C. to about 900° C., preferably about 700° C. to about 900° C., preferably about 700° C. for a period of 2 to 5 hours, preferably 3 to 4 hours, to obtain the neodymium doped zirconia nanoparticles.

According to the present disclosure, the matrix is calcined in a controlled environment to specifically alter the crystal structure and properties of zirconia at nanoscale. The controlled environment may be provided by limiting the type and proportion of gases present in the air. In an example, the matrix is calcined in the presence of air, a mixture of hydrogen and nitrogen gases or pure nitrogen gas. In another example, the matrix is calcined in the presence of a mixture of hydrogen and nitrogen gases wherein the mixture may include about 5% hydrogen gas to nitrogen gas.

The thickness of the radiation shielding material depends on the type of material and the energy of the radiation. For gamma radiation, the thickness and density of the shielding material should be high. Accordingly, in some aspects, the matrix of the radiation shielding material has an average thickness of about 11 to about 13 cm, preferably about 11.5 cm, preferably about 12 cm, most preferably about 12.5 cm. In an example, the matrix of the radiation shielding material has an average thickness of about 12.5 cm.

The matrix may have a density in the range of about 5.8 $g/cm^3$ to about 5.97 $g/cm^3$, about 5.85 $g/cm^3$, about 5.86 $g/cm^3$, about 5.87 $g/cm^3$, about 5.88 $g/cm^3$, about 5.89 $g/cm^3$, about 5.9 $g/cm^3$, about 5.91 $g/cm^3$, about 5.92 $g/cm^3$, about 5.93 $g/cm^3$. In some aspects, density of the matrix in the range of about 5.85 $g/cm^3$ may be preferred. In another aspect, density of the matrix in the range of about 5.9 $g/cm^3$ may be preferred.

The matrix has a linear attenuation coefficient (LAC) of about 0.457 $cm^{-1}$ at about 0.662 MeV. Materials based on lead or lead composites are preferred as radiation shielding materials because of their high efficiency in blocking almost all kinds of radiations. The radiation attenuation ability of the present matrix, according to the present disclosure, can be compared with that of lead. In an example, a matrix having a thickness of about 12.5 cm, according to the present disclosure, is equivalent to a lead-based matrix of thickness 1 cm. In an aspect, the matrix material is configured to attenuate gamma radiation in an energy range of about 0.59 MeV to about 2.506 MeV.

Figure 2:
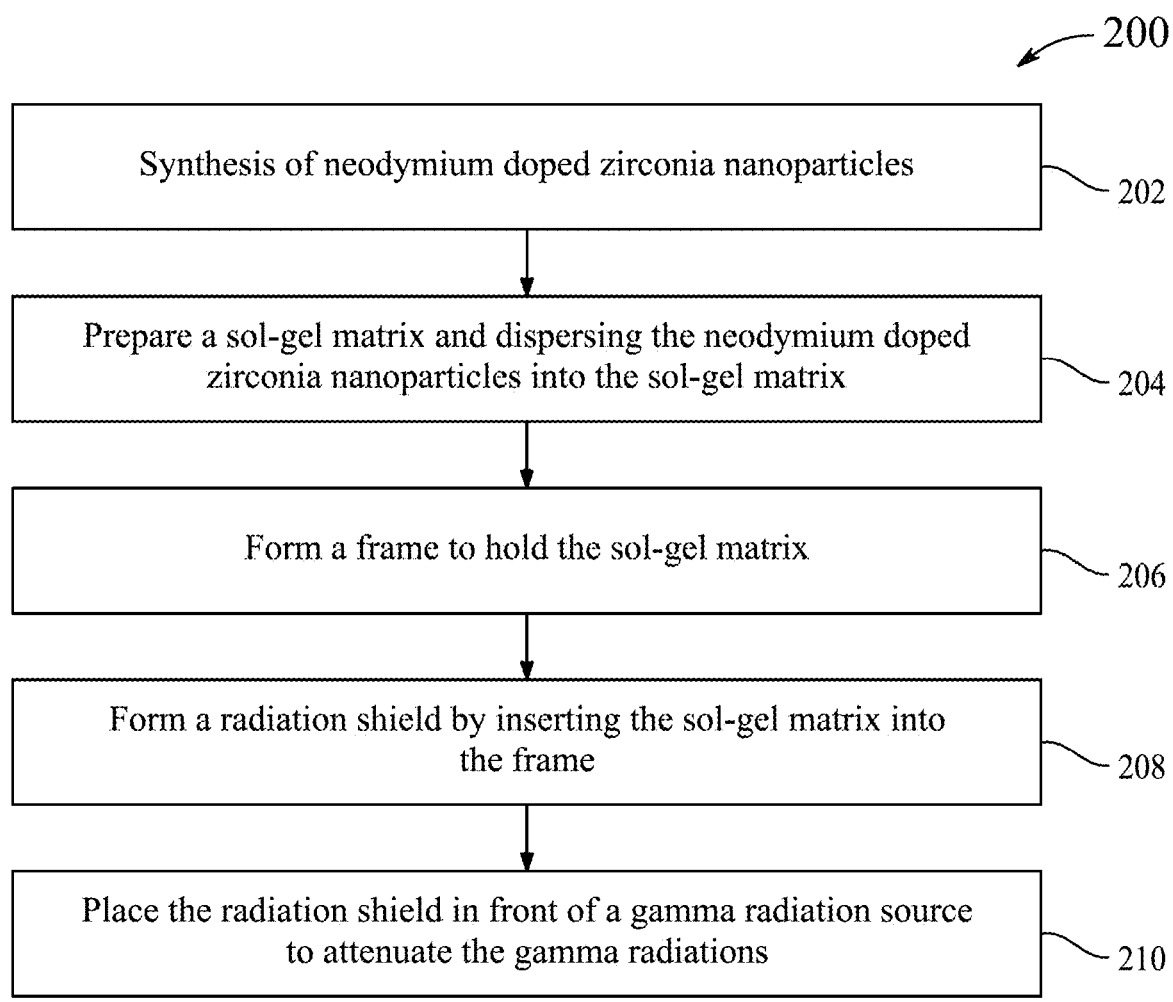
FIG. 2 is a schematic flow chart of a method for forming and using a radiation shield, according to certain embodiments.

Referring to FIG. 2, a schematic flow chart of a method 200 for shielding against gamma radiation is illustrated, according to an aspect of the present disclosure. The order in which the method 200 is described is not intended to be construed as a limitation, and any number of the described method steps can be combined to implement the method 200. Additionally, individual steps may be added to or removed from the method 200 without departing from the spirit and scope of the present disclosure.

At step 202, the method 200 includes the synthesis of the neodymium doped zirconia nanoparticles. The neodymium content in the nanoparticles is adjusted to about 1.5 mol % to about 3 mol % based on the total molar content of the zirconia nanoparticles. In an aspect, the neodymium doped zirconia nanoparticles have a tetragonal crystal structure. The average size of the nanoparticle may range from about 25 nm to about 35 nm. The nanoparticles may attain any shape, although a spherical shape is preferred. The particle homogeneity and sphericity increases with higher neodymium doping levels.

At step 204, the method 200 includes forming a matrix material. The neodymium doped zirconia nanoparticles are dispersed within the matrix. A precursor solution is formed by mixing zirconium oxychloride and neodymium nitrate and is subjected to chelation by a chelating agent. The matrix may be prepared by adding a polyvinylpyrrolidone (PVP) powder dissolved in ethanol to the chelated precursor solution. The addition of PVP may be done with constant stirring for a proper mixing of the components. This may ensure a homogenous dispersion of the nanoparticles in the matrix once they are formed.

At step 206, the method 200 includes forming a frame to hold the matrix in place. The frame may be made of a material which is light weight and resistant to degradation from radiation. The material for frame may also be selected based on the shape given to the matrix. In some aspects, the frame may be made from metals or their alloys, polymers, polymer composites and in some cases, from fabrics used in protective clothing.

At step 208, the method 200 includes inserting the matrix material into the frame to form a radiation shield. The matrix may be removably attached to the frame or may be fixed by means of nuts, screws, bolts or clamping units.

At step 210, the method 200 includes placing the radiation shield in front of a radiation source to attenuate the gamma radiation. In an example, the radiation shield may be placed in front of a gamma radiation source such as a nuclear reactor or a medical imaging equipment to shield against gamma radiation. The radiation shield may be used in any form such that it makes a barrier between the radiation source and the person, area or equipment to be protected. The radiation shield may also be used in containment structures, wearable protective gear, probes, as shields for sensitive electronics and equipment and shields for particle accelerators and detectors.

The method of the present disclosure enables precise control over the crystal structure, resulting in a material that offers enhanced gamma-ray shielding properties while being environmentally safe. Further, the present disclosure provides a superior alternative to traditional shielding materials, particularly in extreme environments such as nuclear reactors and space exploration. The high density, toughness, and environmental safety of neodymium-doped stabilized zirconia set it apart from conventional materials like lead and concrete, addressing key issues such as weight, toxicity, durability, and practicality in advanced radiation shielding applications. The unique process for the synthesis of nanoparticles combines modified hydrothermal processing with polymer-assisted sol-gel techniques and strategic sonication which results in nanoparticles with optimized size, shape, and distribution crucial for maximizing radiation attenuation. Moreover, the process avoids toxic precursors and enables easier scaling for industrial production, addressing both performance and practical manufacturing concerns. The neodymium-stabilized tetragonal phase created by this process exhibits superior radiation interaction cross-sections compared to traditional zirconia, particularly at lower gamma-ray energies where many current materials are less effective. The radiation shielding material of the present disclosure finds uses in various fields including nuclear power industry, medical imaging and radiotherapy, aerospace and space exploration, defense and security, industrial radiography and high-energy physics research.

EXAMPLES

The following examples demonstrate the radiation shielding material as described herein. The examples are provided solely for illustration and are not to be construed as limitations of the present disclosure, as many variations thereof are possible without departing from the spirit and scope of the present disclosure.

Figure 3:
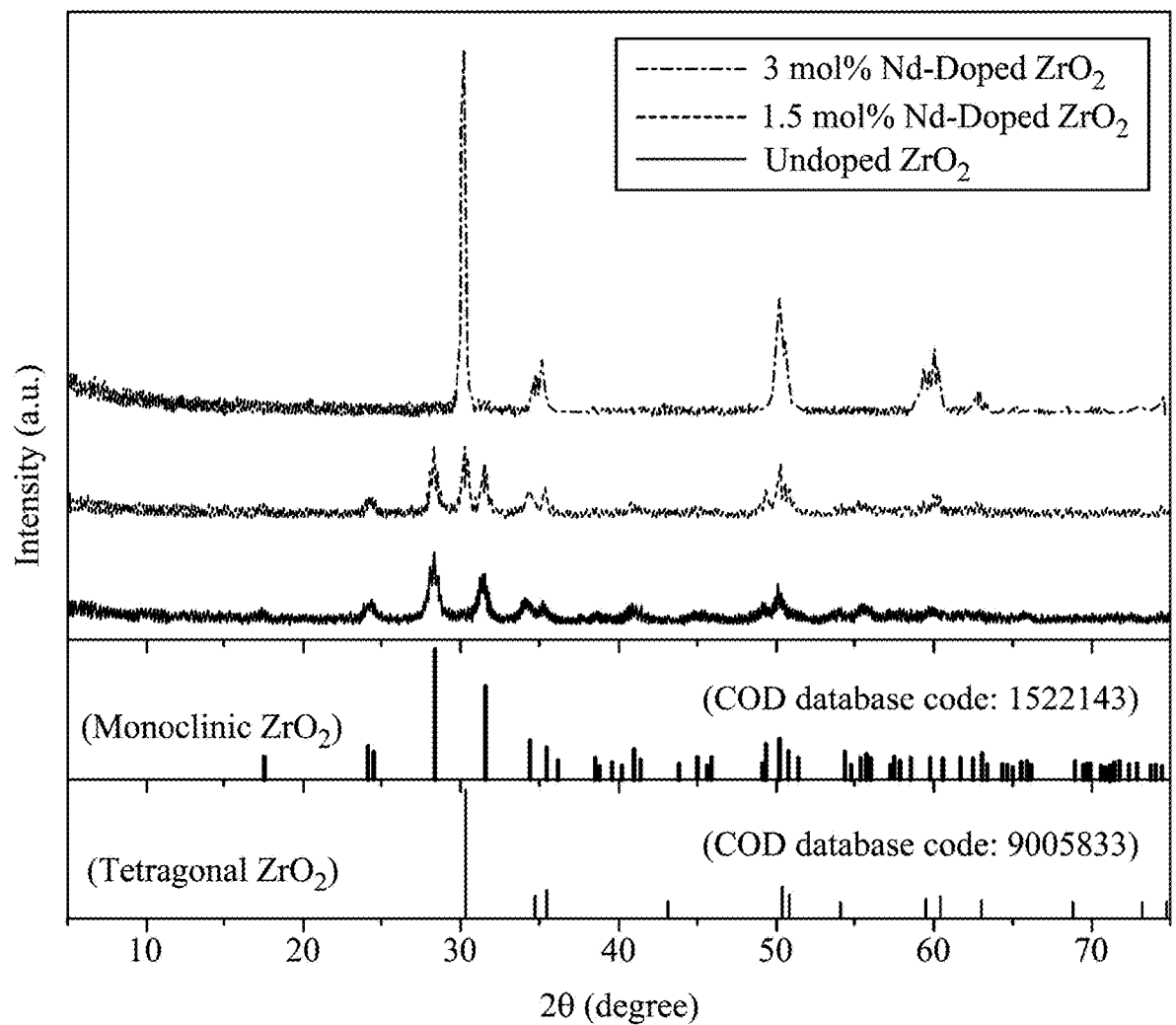
FIG. 3 shows X-ray diffraction (XRD) pattern of undoped zirconia, 1.5 mol % Nd-doped zirconia and 3 mol % Nd-doped zirconia samples, according to certain embodiments.

Example 1: Characterization of the Structure and Morphology of Neodymium Doped Zirconia Nanoparticles An XRD pattern of undoped zirconia, 1.5 mol % Nd-doped zirconia and 3 mol % Nd-doped zirconia samples is shown in FIG. 3. The graph displays intensity peaks against 2θ angles. The undoped sample exhibits characteristic peaks of monoclinic zirconia. The 1.5 mol % Nd-doped sample shows a mixture of monoclinic and tetragonal phases, while the 3 mol % Nd-doped sample predominantly displays tetragonal phase peaks. This figure illustrates the phase transformation induced by neodymium doping. This results in a precisely controlled neodymium-driven phase transformation process that fundamentally alters the crystal structure and properties of zirconia at the nanoscale. As indicated, a controlled metamorphosis from monoclinic to tetragonal zirconia occurs under the calibrated neodymium incorporation process. The crystalline structure of the tetragonal phase of zirconia captures the gamma radiation by internal scattering, thus providing the radiation shielding effect.

Figure 4:
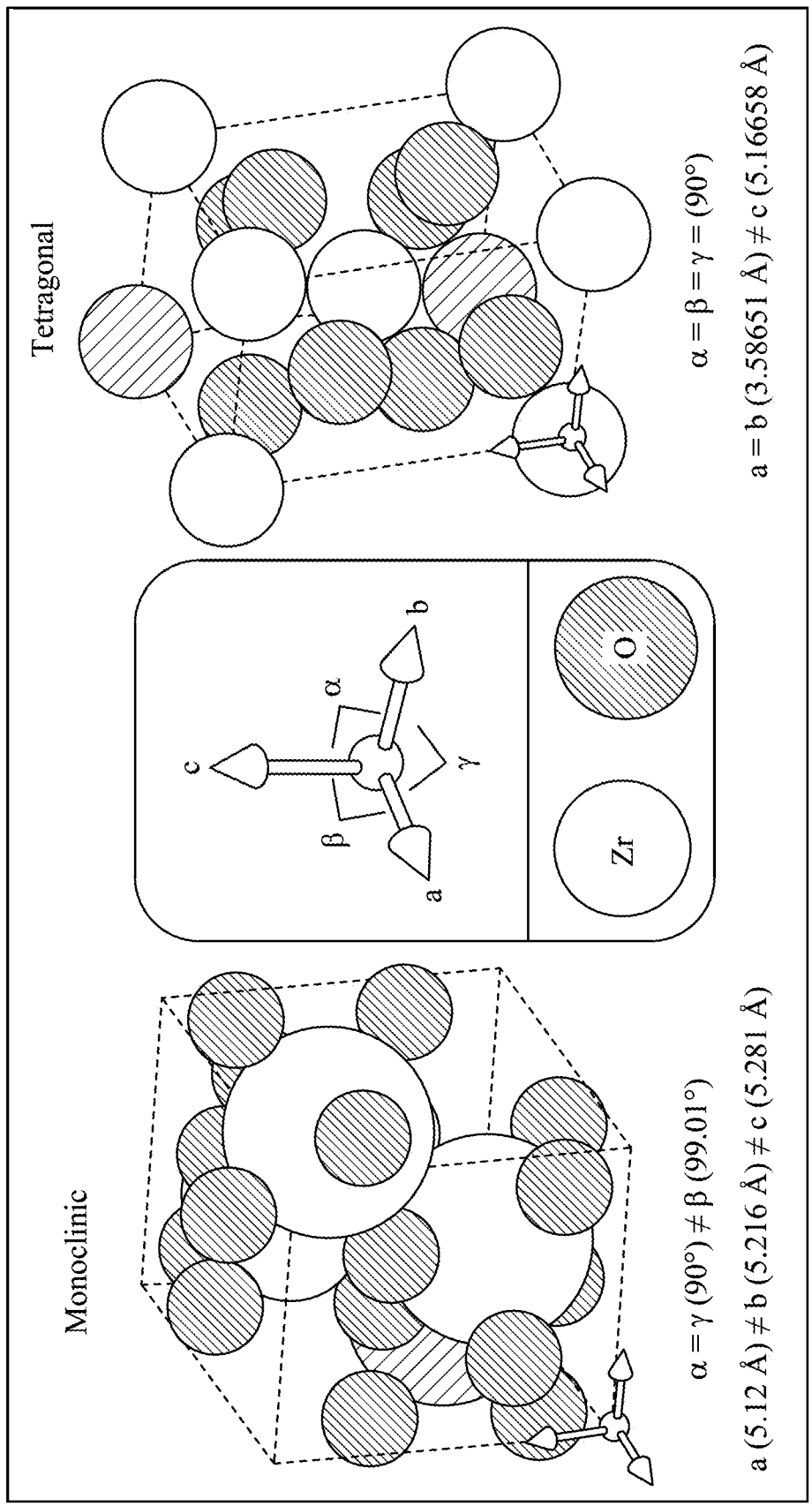
FIG. 4 shows unit cell diagrams of monoclinic and tetragonal crystal systems, according to certain embodiments.

The schematic diagrams of the unit cells for monoclinic and tetragonal zirconia crystal systems are as shown in FIG. 4. The monoclinic structure is characterized by unequal axes ($a \neq b \neq c$) and one non $-90°°$ angle ($\beta$), while the tetragonal structure has two equal axes ($a=b \neq c$) and all 90° angles. These diagrams highlight the structural differences between the two phases of zirconia.

Figure 5:
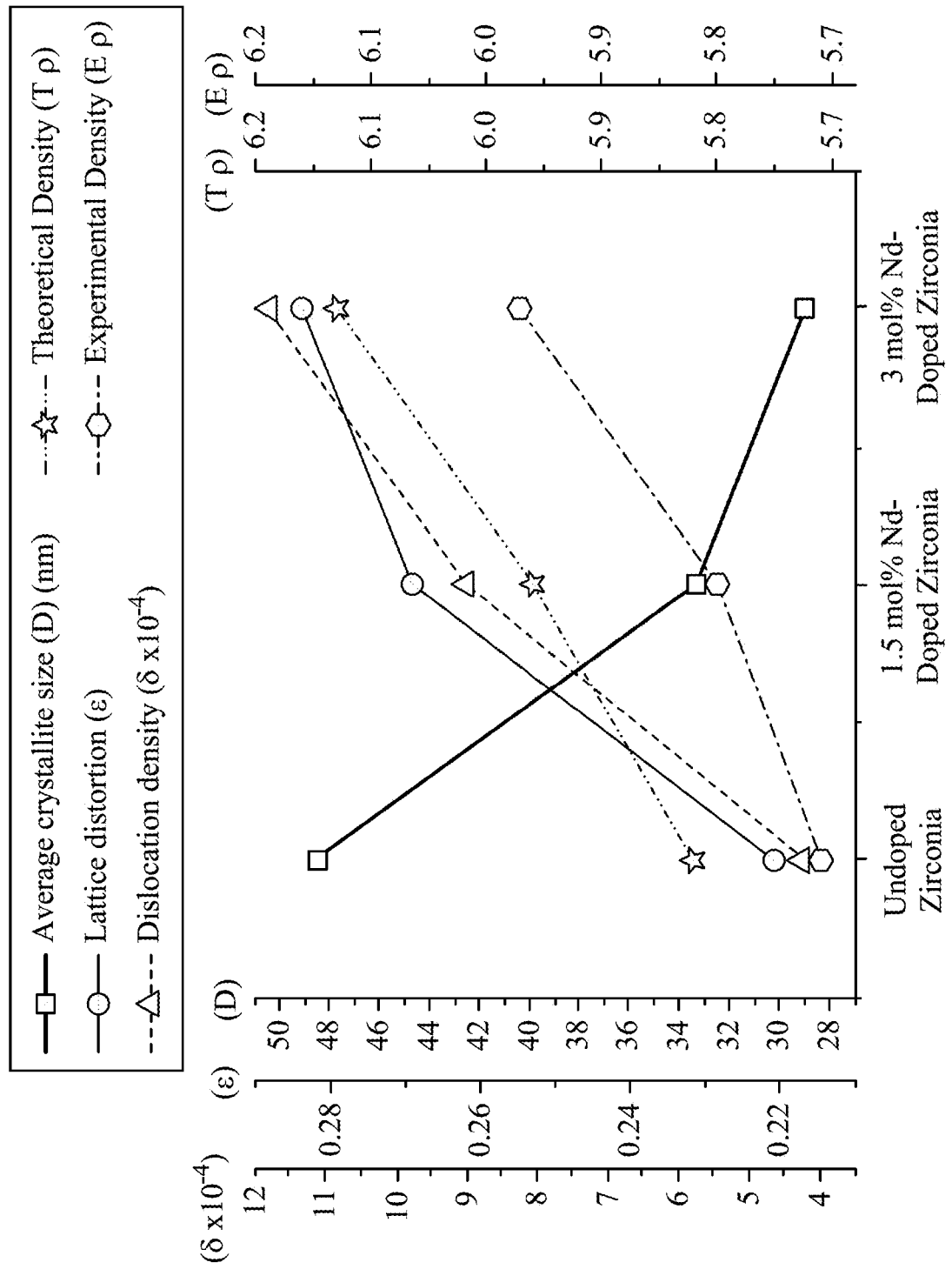
FIG. 5 shows crystallite size, lattice distortion, dislocation density, theoretical density, and experimental density of undoped zirconia, 1.5 mol % Nd-doped zirconia, and 3 mol % Nd-doped zirconia samples, according to certain embodiments.

FIG. 5 shows a multi-panel graph showing various structural properties of the three zirconia samples. The crystallite size ($\delta \times 10^{-4}$), lattice distortion ($\varepsilon$), dislocation density (D), theoretical density (T $\rho$), and experimental density (E $\rho$) of undoped zirconia, 1.5 mol % Nd-doped zirconia, and 3 mol % Nd-doped zirconia samples are illustrated. A decreasing crystallite size with increasing Nd content, increasing lattice distortion and rising dislocation density with higher Nd doping was observed. The figure shows theoretical density calculations for each sample followed by experimental density measurements, showing the difference between calculated and actual densities. These data demonstrate how Nd doping affects the nanostructure and physical properties of zirconia.

Figure 6A:
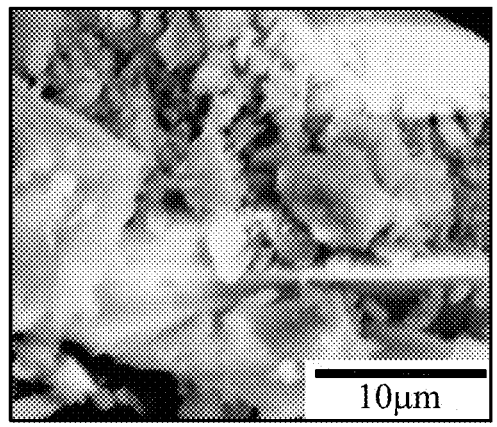
FIG. 6A shows scanning electron microscope (SEM) images of undoped zirconia sample, according to certain embodiments.
Figure 6B:
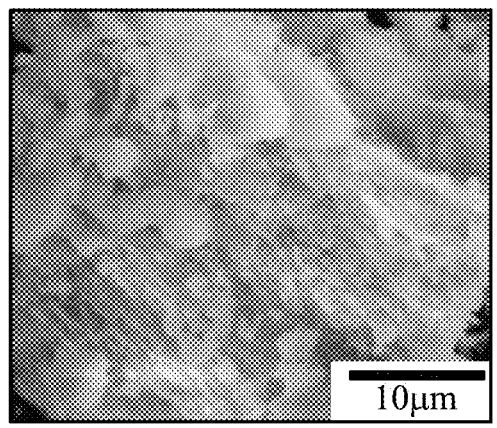
FIG. 6B shows SEM images of 1.5 mol % Nd-doped zirconia, according to certain embodiments.
Figure 6C:
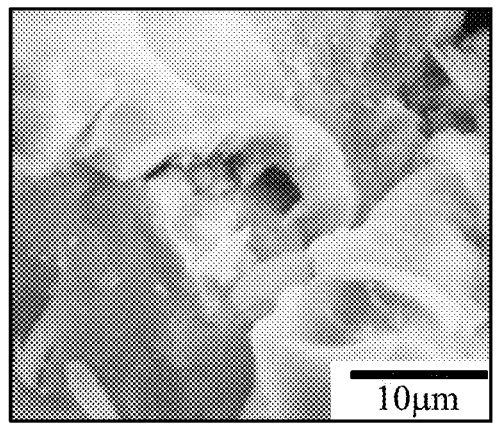
FIG. 6C shows SEM images of 3 mol % Nd-doped zirconia sample, according to certain embodiments.
Figure 6D:
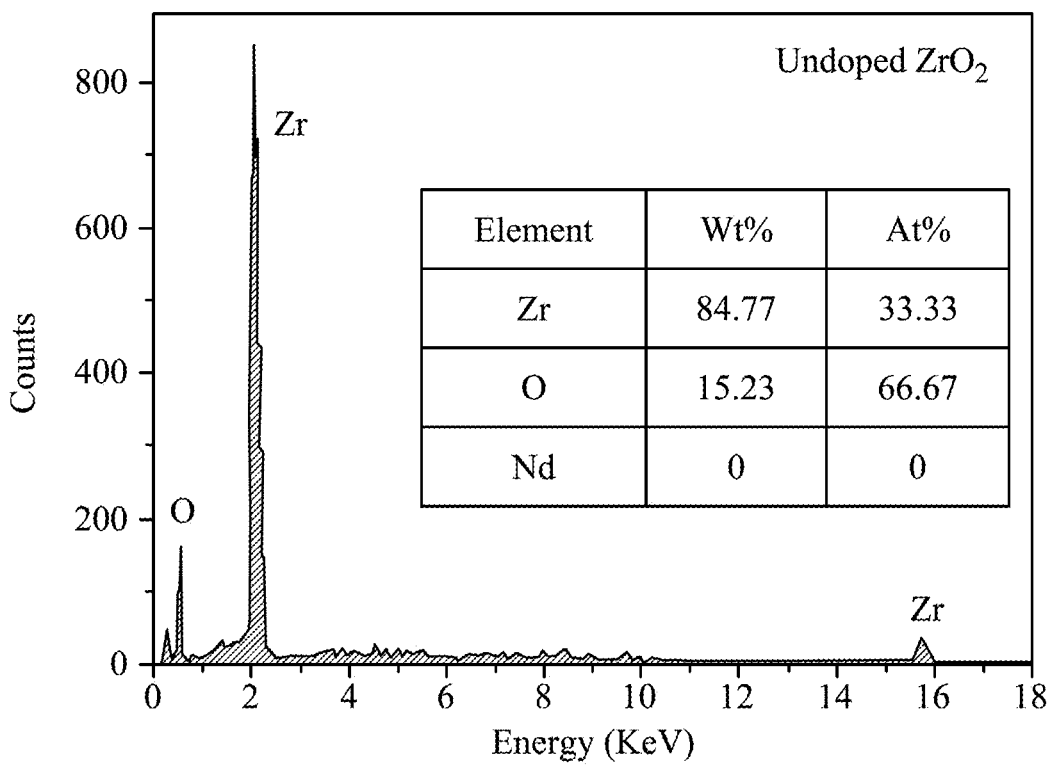
FIG. 6D shows energy-dispersive x-ray spectroscopy (EDX) analysis of undoped zirconia sample, according to certain embodiments.
Figure 6E:
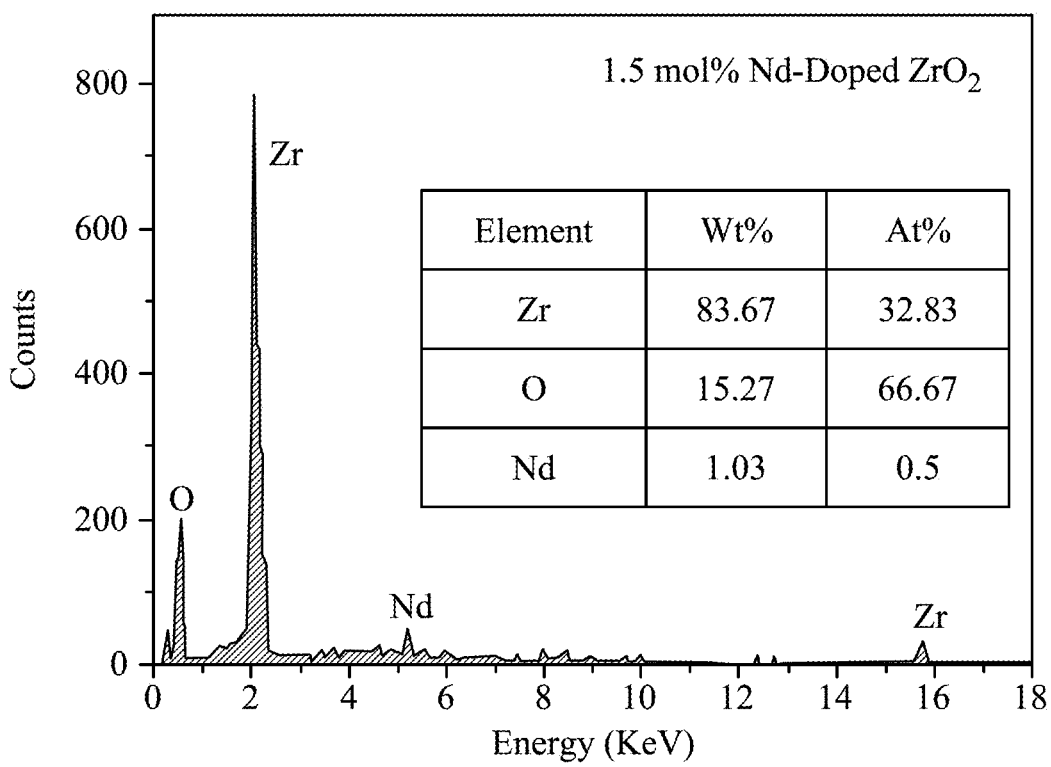
FIG. 6E shows EDX analysis of 1.5 mol % Nd-doped zirconia sample, according to certain embodiments.
Figure 6F:
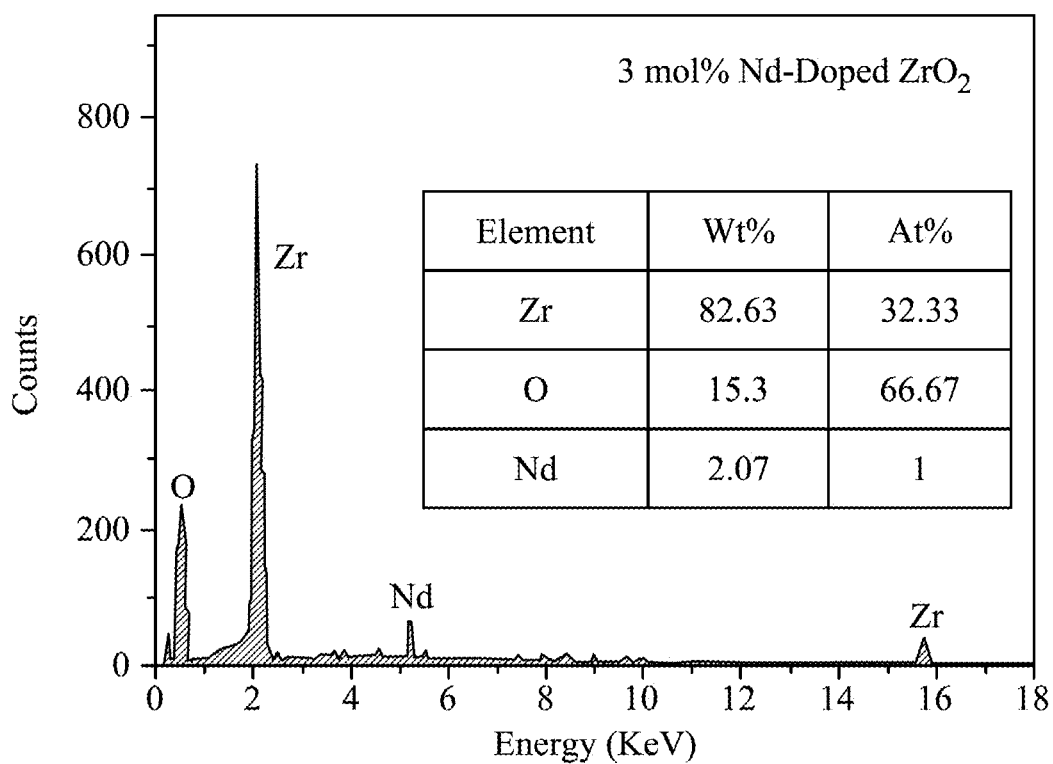
FIG. 6F shows EDX analysis of 3 mol % Nd-doped zirconia sample, according to certain embodiments.

The morphology of the undoped zirconia, 1.5 mol % Nd-doped zirconia and 3 mol % Nd-doped zirconia was studied using scanning electron microscopy (SEM) and energy-dispersive X-ray spectroscopy (EDX). The SEM images of the undoped zirconia (FIGS. 6A and 6D), 1.5 mol % Nd-doped zirconia (FIGS. 6B and 6E) and 3 mol % Nd-doped zirconia (FIGS. 6C and 6F) reveal changes in particle size, shape, and distribution with increasing Nd content. The corresponding EDX spectra for each sample, showing elemental composition, display peaks for Zr, O, and Nd in doped samples with changing intensities reflecting the doping levels.

Figure 7A:
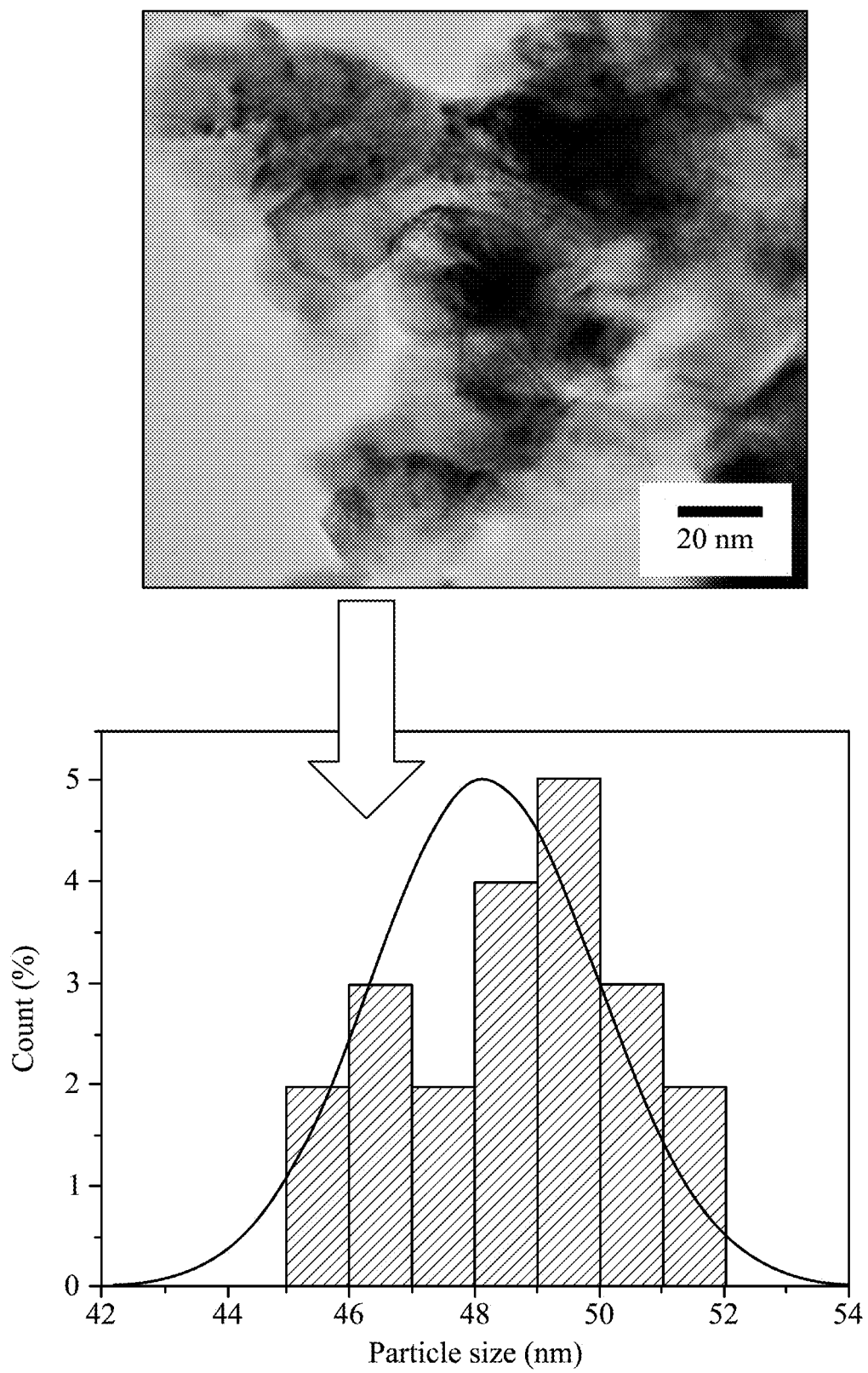
FIG. 7A shows transmission electron microscopy (TEM) image and particle size distribution of undoped zirconia sample, according to certain embodiments.
Figure 7B:
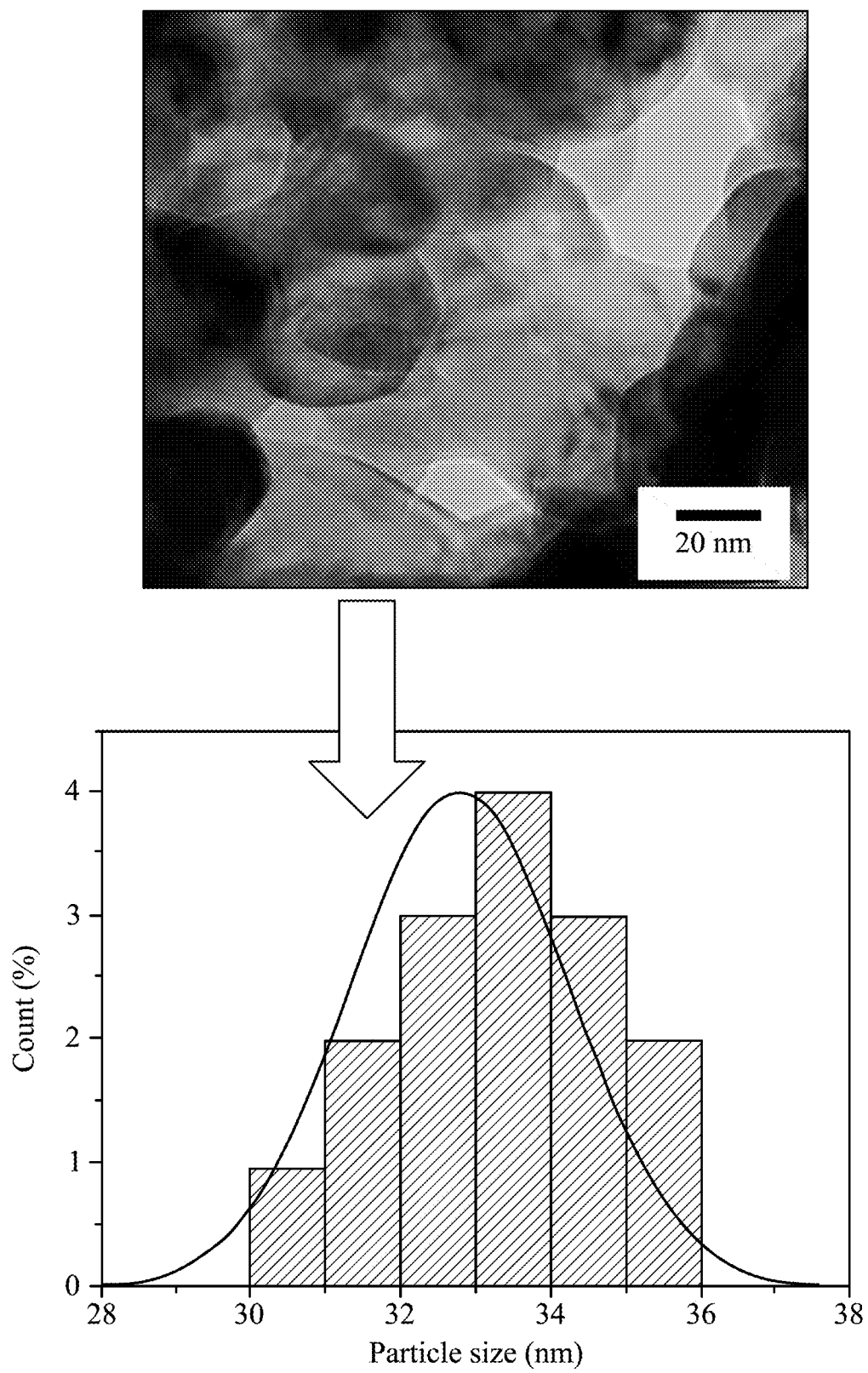
FIG. 7B shows TEM image and particle size distribution of 1.5 mol % Nd-doped zirconia sample, according to certain embodiments.
Figure 7C:
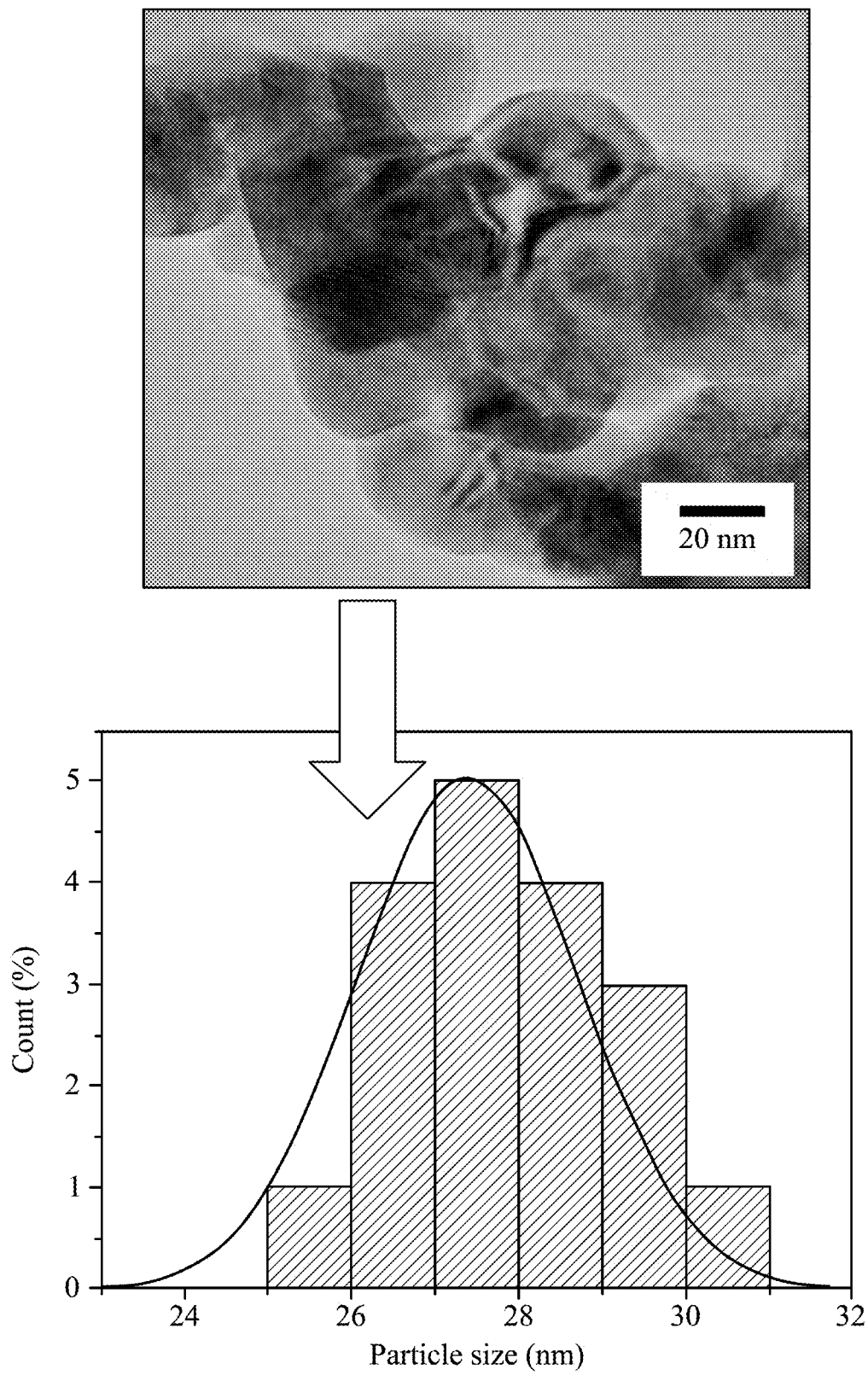
FIG. 7C shows TEM image and particle size distribution of 3 mol % Nd-doped zirconia sample, according to certain embodiments.

FIG. 7A, FIG. 7B and FIG. 7C illustrate the transmission electron microscopy (TEM) images and particle size distribution for the three zirconia samples: the undoped zirconia (FIG. 7A), 1.5 mol % Nd-doped zirconia (FIG. 7B) and 3 mol % Nd-doped zirconia samples (FIG. 7C). The TEM images show high-resolution views of individual nanoparticles, revealing their shape and internal structure. The particle size distribution graphs illustrate how the average particle size and size range change with Nd doping.

Figure 8A:
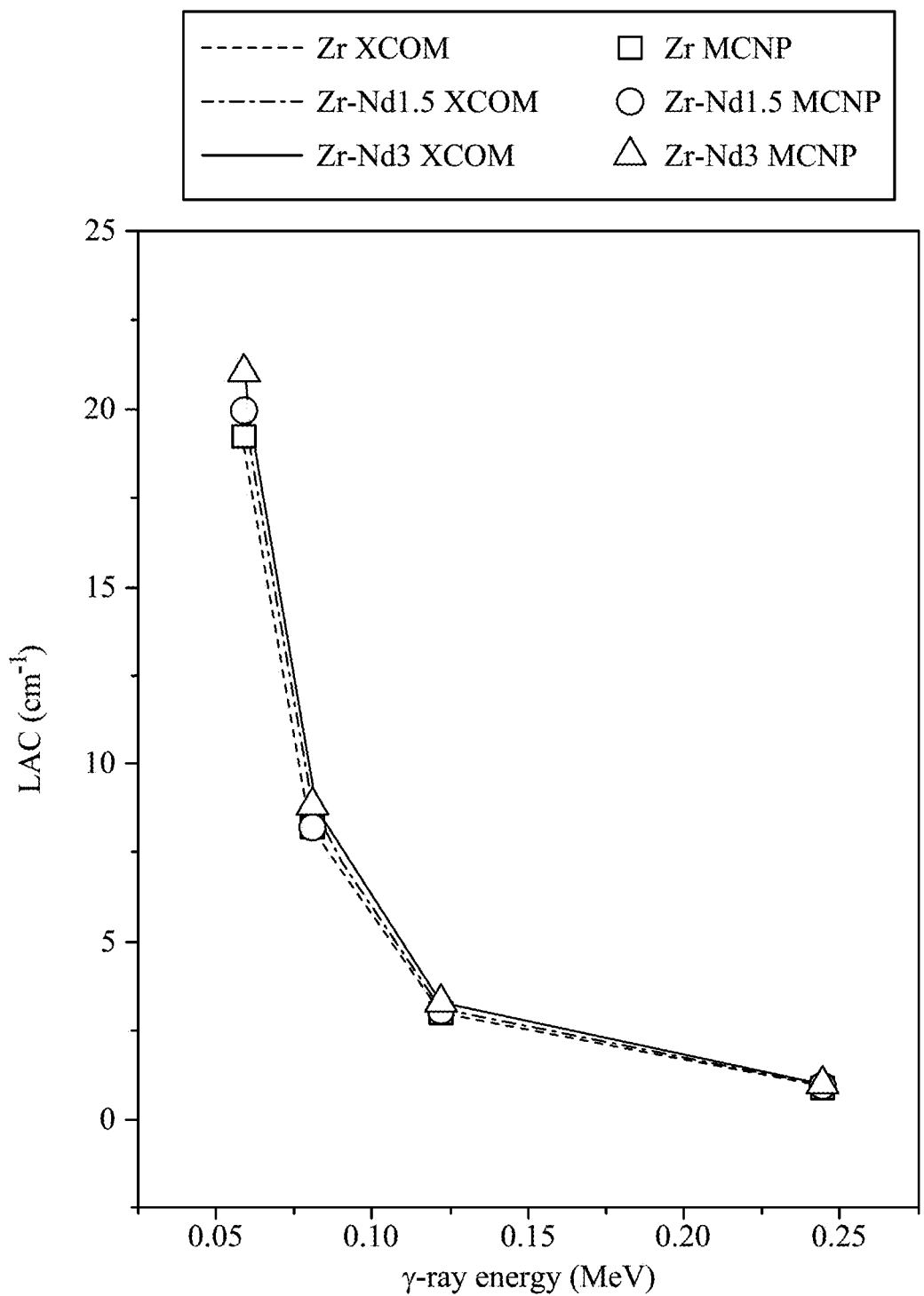
FIG. 8A shows the linear attenuation coefficient (LAC) of the zirconia samples at various γ-ray energy over the energy interval of photoelectric interaction, according to certain embodiments.
Figure 8B:
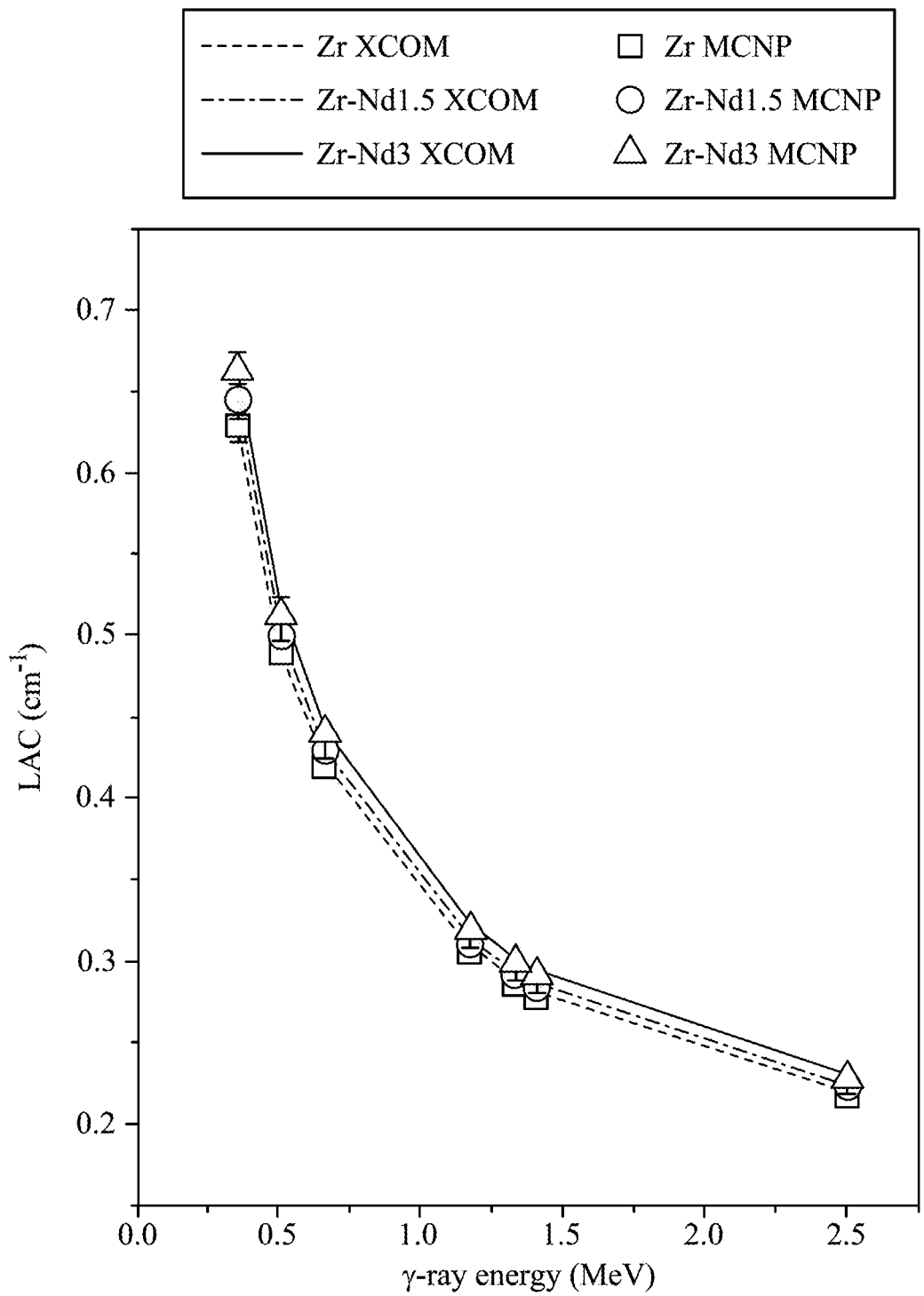
FIG. 8B shows the LAC of the zirconia samples at various γ-ray energy over the energy interval of Compton scattering interaction, according to certain embodiments.
Figure 9A:
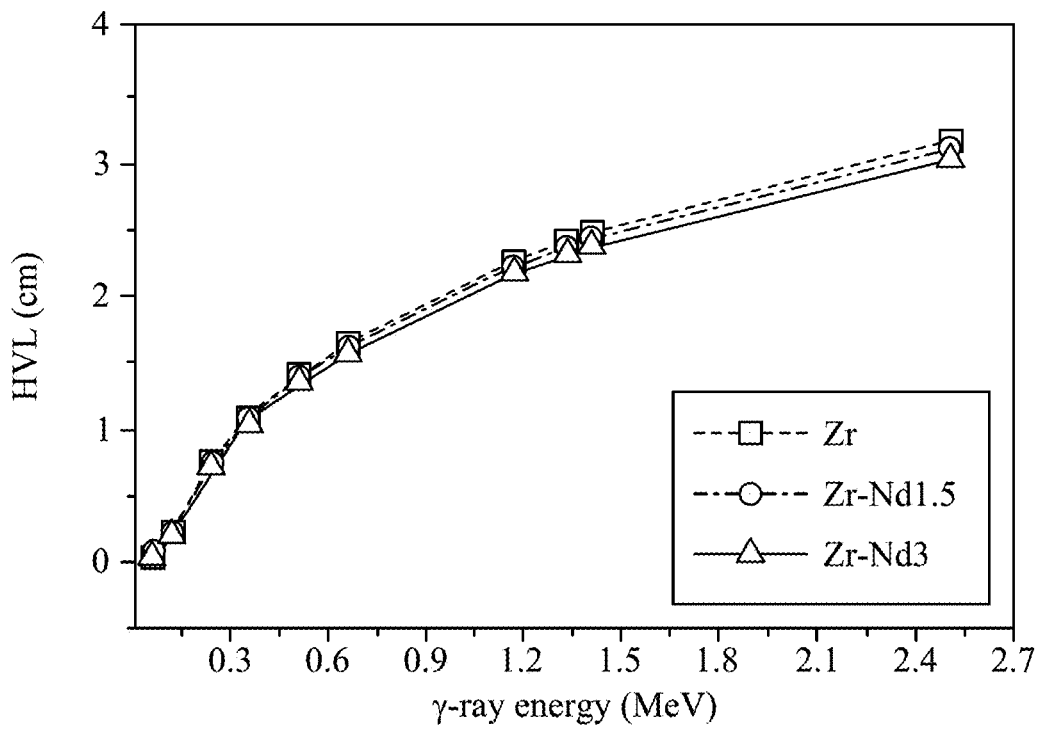
FIG. 9A shows the effect of γ-ray energy on half value layer (HVL, cm), according to certain embodiments.
Figure 9B:
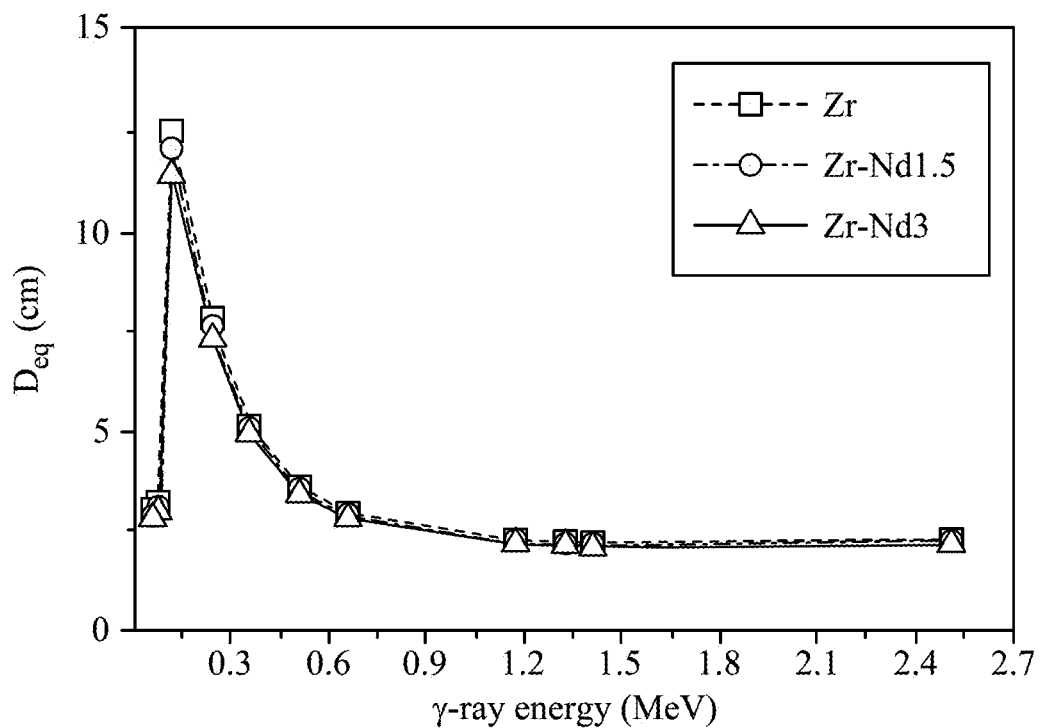
FIG. 9B shows the effect of γ-ray energy on lead equivalence (Deq, cm), according to certain embodiments.
Figure 9C:
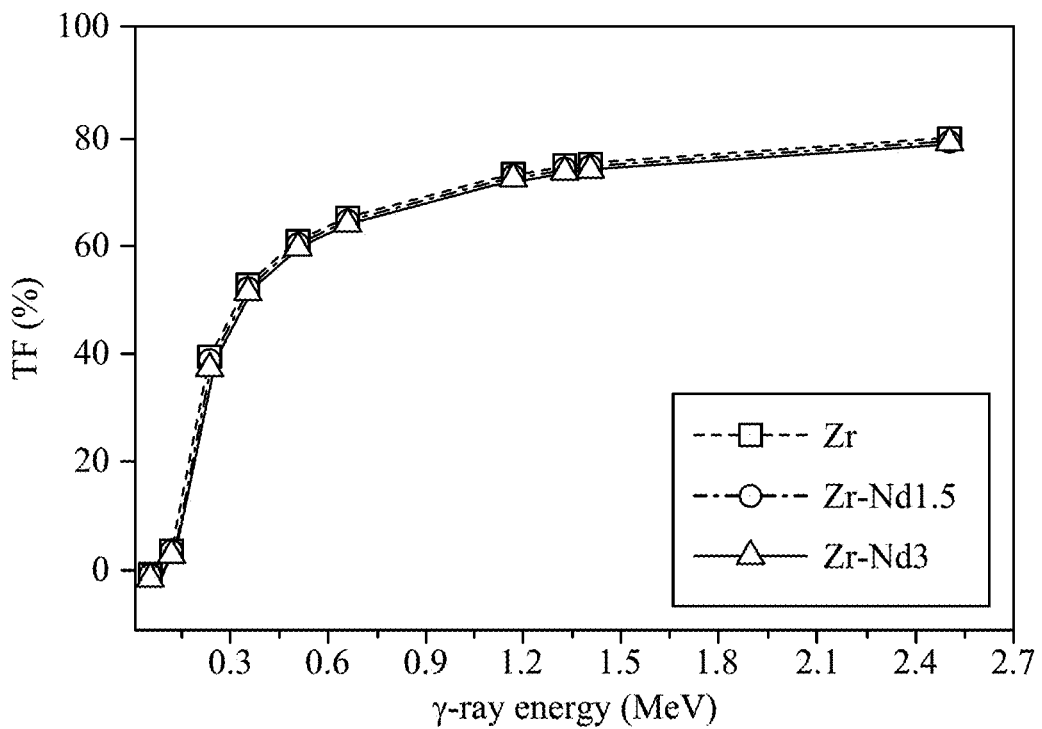
FIG. 9C shows the effect of γ-ray energy on transmission factor (TF, %), according to certain embodiments.
Figure 9D:
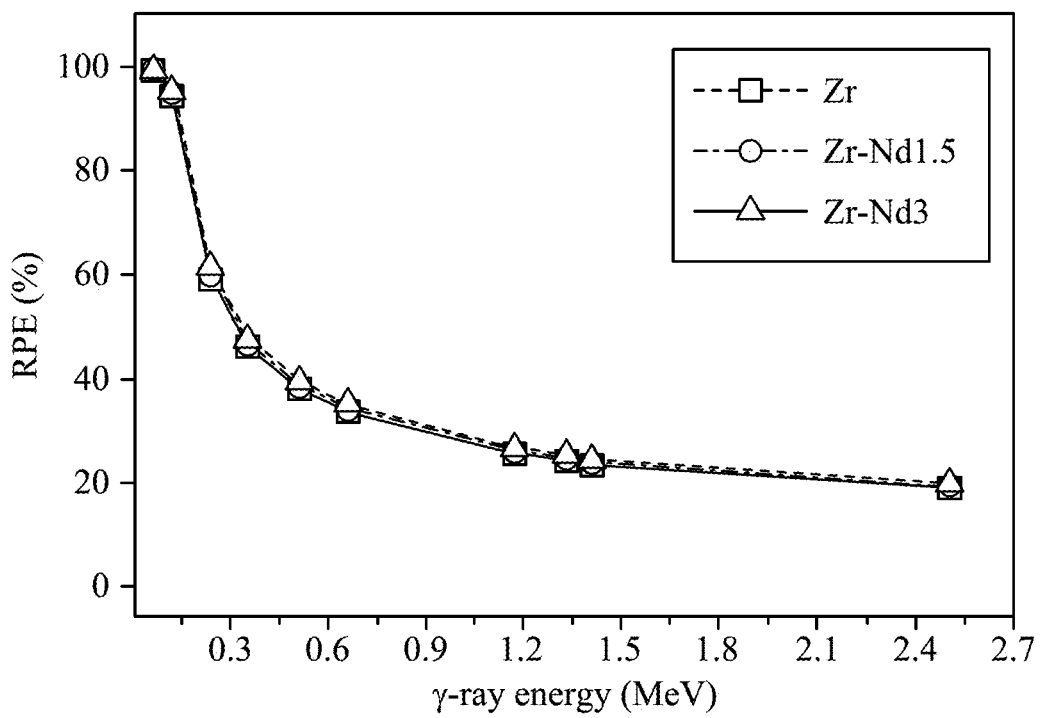
FIG. 9D shows the effect of γ-ray energy on radiation protection efficiency (RPE, %), according to certain embodiments.
Figure 10A:
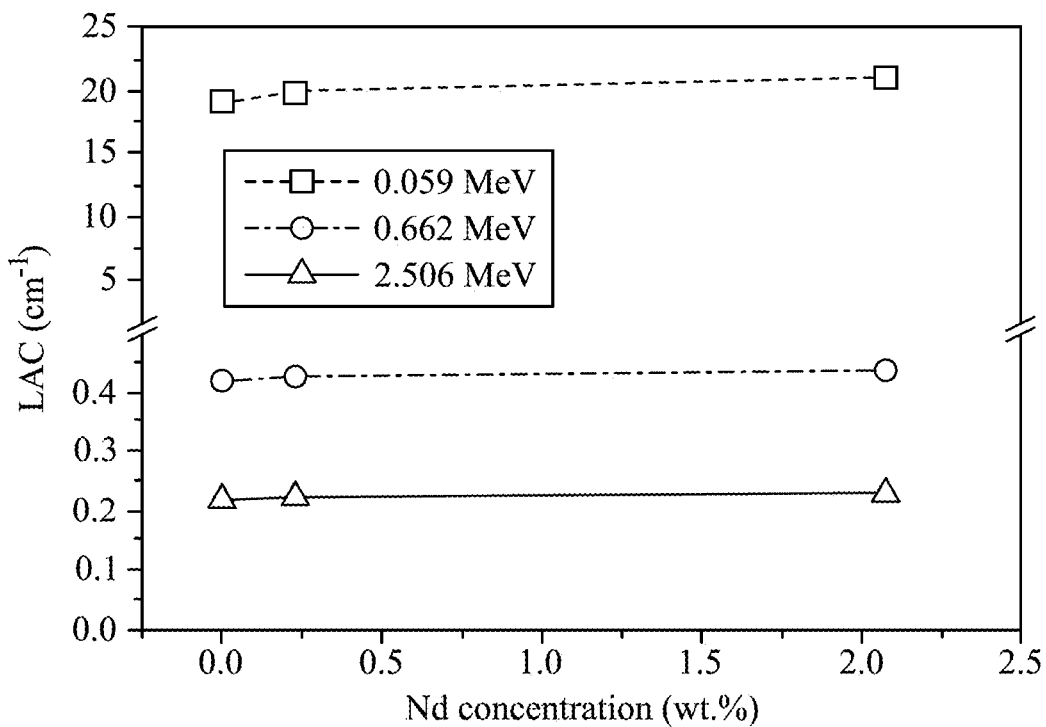
FIG. 10A shows the impact of increasing the Nd concentration on the LAC of the modified samples, according to certain embodiments.
Figure 10B:
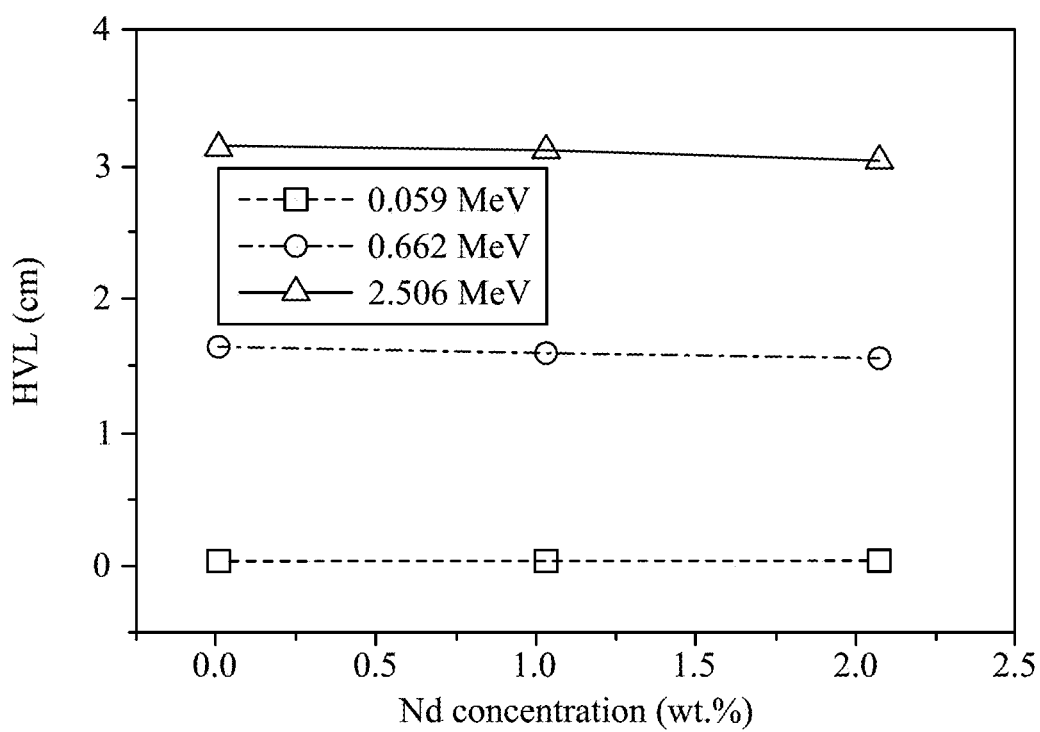
FIG. 10B shows the impact of increasing the Nd concentration on the HVL of the modified samples, according to certain embodiments.
Figure 10C:
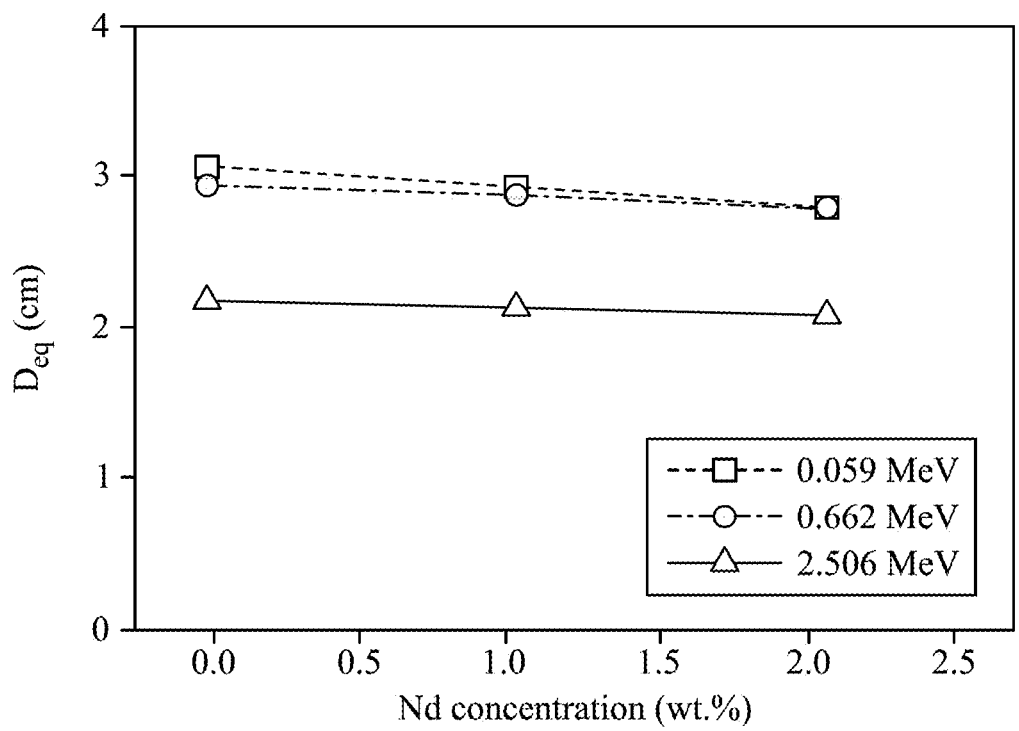
FIG. 10C shows the impact of increasing the Nd concentration on lead equivalence of the modified samples, according to certain embodiments.
Figure 10D:
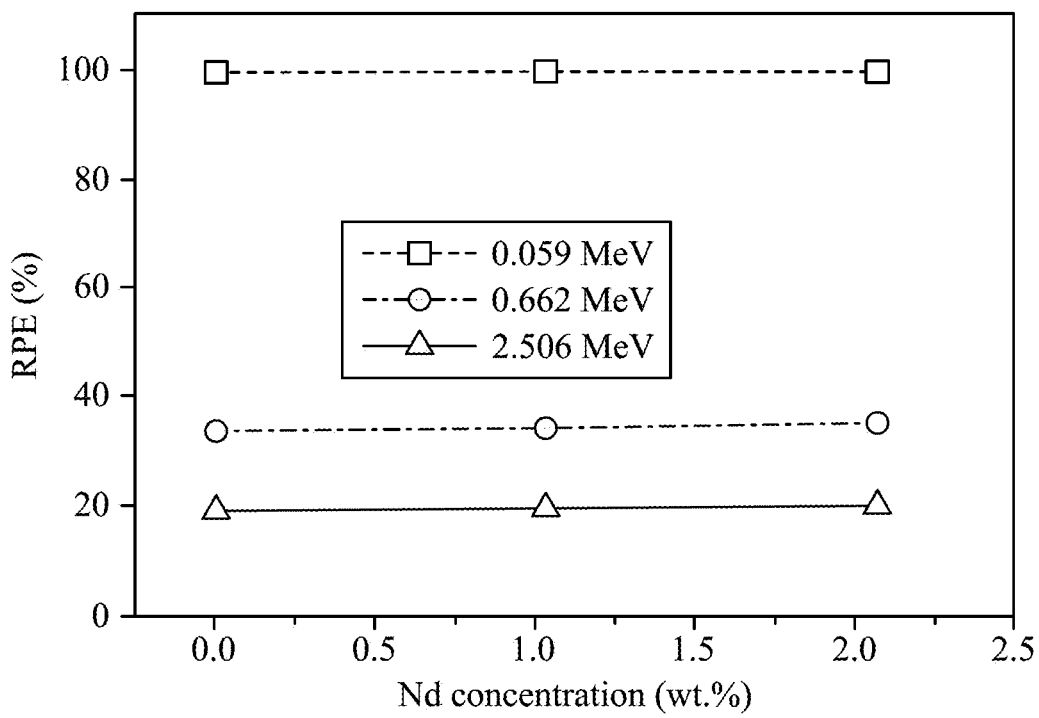
FIG. 10D shows the impact of increasing the Nd concentration on radiation protection efficiency of the modified samples, according to certain embodiments.

Example 2: Characterization of the Properties of the Radiation Shielding Material FIG. 8A shows a graph depicting the linear attenuation coefficient (LAC) of the zirconia samples as a function of gamma-ray energy in the photoelectric interaction range from about 0.059 MeV to about 0.244 MeV. FIG. 8B shows a graph depicting the LAC of the zirconia samples as a function of gamma-ray energy in the Compton scattering range from about 0.356 to about 2.506 MeV. These graphs demonstrate the ability of the prepared compositions to attenuate gamma radiation changes with respect to x-ray energy and doping levels.

The radiation shielding properties of the zirconia samples including half value layer (HVL), lead equivalence (Deq), transmission factor (TF) and radiation protection efficiency (RPE) as functions of gamma-ray energy are illustrated in FIG. 9. The half value layer (HVL, cm) is the thickness required to reduce radiation intensity by half and is illustrated in FIG. 9A. FIG. 9B illustrates that the thickness of synthesized materials has the same shielding properties as 1 cm of lead (Deq, cm). The percentage of radiation passing through the material is measured in terms of the transmission factor (TF) and is illustrated in FIG. 9C and FIG. 9D illustrates the effectiveness of the material in blocking radiation as the radiation protection efficiency (RPE). These graphs show how Nd doping affects these properties across different gamma-ray energies.

FIG. 10 illustrates the effects of increasing Nd concentration on various radiation shielding properties: Linear attenuation coefficient (FIG. 10A), half value layer (FIG. 10B), lead equivalence (FIG. 10C) and radiation protection efficiency (FIG. 10D). These graphs show data points for undoped, 1.5 mol %, and 3 mol % Nd-doped samples at different gamma-ray energies (e.g., 0.059 MeV, 0.662 MeV, and 2.506 MeV).

A first embodiment describes a gamma radiation shielding material including a matrix material comprising neodymium-doped zirconia nanoparticles. The neodymium-doped zirconia nanoparticles are dispersed within the matrix material wherein the neodymium-doped zirconia nanoparticles have a tetragonal crystal structure, a neodymium content selected from a range of about 1.5 mol % and about 3.0 mol % of a total molar content of the zirconia nanoparticles, and an average size in a range of about 25 nm to about 35 nm.

In an aspect, the matrix material exhibits a linear attenuation coefficient of at least 0.457 $cm^{-1}$ at about 0.662 MeV.

In an aspect, the matrix material has a density in a range of about 5.8 $g/cm^3$ to about 5.97 $g/cm^3$.

In an aspect, the neodymium-doped zirconia nanoparticles exhibit mixed monoclinic-tetragonal X-ray diffraction phase intensity peaks when the neodymium content is 1.5 mol %.

In an aspect, the neodymium-doped zirconia nanoparticles exhibit predominantly tetragonal X-ray diffraction phase intensity peaks when the neodymium content is selected to be 3.0 mol %.

In an aspect, the matrix material is configured to attenuate gamma rays generated by a gamma radiation source in an energy range of about 0.059 MeV to about 2.506 MeV.

In an aspect, the thickness of the matrix material of about 12.5 cm has a lead equivalence of 1 cm of lead.

In an aspect, a radiation shield comprising the gamma radiation shielding material and a frame are configured to hold the matrix material, wherein the frame and matrix material are configured to attenuate gamma radiation in an energy range of about 0.059 MeV to about 2.506 MeV.

In an aspect, the neodymium-doped zirconia nanoparticles are made by mixing a zirconium oxychloride solution with a neodymium nitrate solution to form a precursor solution, chelating the precursor solution, forming a sol-gel from the chelated precursor solution by adding a polyvinylpyrrolidone powder dissolved in ethanol, adjusting a pH of the sol-gel to about 10.5 by adding a quantity of ammonium hydroxide, performing a hydrothermal treatment at about 190° C. for about 24 hours, and forming the neodymium-doped zirconia nanoparticles by calcinating the hydrothermally treated sol-gel at a temperature selected from a range of about 600° C. to about 950° C.

In an aspect, the process comprises forming the precursor solution by mixing about 0.1 M of the zirconium oxychloride solution dissolved in about eight molecules of water and mixing about 01. M of the neodymium nitrate solution dissolved in about six molecules of water.

In an aspect, the process comprises dispersing a graphene oxide composition into the pH adjusted sol-gel before performing the hydrothermal treatment, wherein the graphene oxide is present in an amount of about 0.5 wt. %, wherein wt. % is based on a total weight of the pH adjusted sol-gel.

In an aspect, calcinating the hydrothermally treated sol-gel is performed in an atmosphere selected from at least one of air, a mixture of 5% hydrogen gas to nitrogen gas ($H_2/N_2$) and pure nitrogen gas ($N_2$).

In an aspect, chelating the precursor solution comprises adding acetylacetone to the precursor solution, wherein the acetylacetone is configured to control hydrolysis in the precursor solution.

A second embodiment describes a process for synthesizing neodymium-doped zirconia nanoparticles having a tetragonal crystal structure for use in gamma radiation shielding, comprising forming a precursor solution by mixing a zirconium oxychloride solution with a neodymium nitrate solution, adding a chelating agent comprising acetylacetone to the precursor solution, wherein the acetylacetone is configured to control hydrolysis in the precursor solution, forming a sol-gel matrix material by adding a polyvinylpyrrolidone powder dissolved in ethanol to the chelated precursor solution, adjusting a pH of the sol-gel matrix material to about 10.5 by adding a quantity of ammonium hydroxide, dispersing a graphene oxide composition into the pH adjusted sol-gel matrix material, wherein the graphene oxide is present in an amount of about 0.5 wt. %, wherein wt. % is based on a total weight of the pH adjusted sol-gel matrix material, performing a hydrothermal treatment at a temperature of about 190° C. for about 24 hours, and forming the neodymium-doped zirconia nanoparticles by calcinating the hydrothermally treated sol-gel matrix material at a temperature selected from a range of about 600° C. to about 950° C.

In an aspect, the process comprises forming the precursor solution by mixing about 0.1 M of the zirconium oxychloride solution dissolved in about eight molecules of water and mixing about 01. M of the neodymium nitrate solution dissolved in about six molecules of water.

In an aspect, the process comprises adjusting a neodymium content of the neodymium nitrate solution to a range of about 1.5 mol % to about 3.0 mol %.

In an aspect, the process comprises utilizing an ultrasonic mixer to disperse the graphene oxide composition into the pH adjusted sol-gel matrix material.

In an aspect, the process comprises forming a frame configured to hold the calcinated hydrothermally treated sol-gel matrix material, and forming a radiation shield by inserting the calcinated hydrothermally treated sol-gel matrix material into the frame, wherein the radiation shield is configured to attenuate gamma radiation in an energy range of about 0.059 MeV to about 2.506 MeV.

A third embodiment describes a method of shielding against gamma radiation, comprising synthesizing neodymium-doped zirconia nanoparticles, wherein the neodymium-doped zirconia nanoparticles have a tetragonal crystal structure, a neodymium content selected from a range of about 1.5 mol % and about 3.0 mol %, and an average size in a range of about 25 nm to about 35 nm, forming a matrix material comprising the neodymium-doped zirconia nanoparticles, wherein the neodymium-doped zirconia nanoparticles are dispersed within the matrix material, forming a frame configured to hold the calcinated hydrothermally treated sol-gel matrix material, forming a radiation shield by inserting the calcinated hydrothermally treated sol-gel matrix material into the frame, and placing the radiation shield in front of a gamma radiation source to attenuate the gamma radiation in an energy range of about 0.059 MeV to about 2.506 MeV.

In an aspect, the method comprises synthesizing neodymium-doped zirconia nanoparticles by forming a precursor solution by mixing a zirconium oxychloride solution with a neodymium nitrate solution, adding a chelating agent comprising acetylacetone to the precursor solution, wherein the acetylacetone is configured to control hydrolysis in the precursor solution, forming a sol-gel matrix material by adding a polyvinylpyrrolidone powder dissolved in ethanol to the chelated precursor solution, adjusting a pH of the sol-gel matrix material to about 10.5 by adding a quantity of ammonium hydroxide, dispersing a graphene oxide composition into the pH adjusted sol-gel matrix material, wherein the graphene oxide is present in an amount of about 0.5 wt. %, wherein wt. % is based on a total weight of the pH adjusted sol-gel matrix material, performing a hydrothermal treatment at a temperature of about 190° C. for about 24 hours, and forming the neodymium-doped zirconia nanoparticles by calcinating the hydrothermally treated sol-gel matrix material at a temperature selected from a range of about 600° C. to about 950° C.

Numerous modifications and variations of the present disclosure are possible in light of the above teachings. It is therefore to be understood that within the scope of the appended claims, the invention may be practiced otherwise than as specifically described herein.

The invention claimed is:

1. A gamma radiation shielding material, comprising:
   a matrix material comprising neodymium-doped zirconia nanoparticles, wherein the neodymium-doped zirconia nanoparticles are dispersed within the matrix material, wherein the neodymium-doped zirconia nanoparticles have:
      a tetragonal crystal structure,
      a neodymium content of from about 1.5 mol % to about 3.0 mol % based on a total molar content of the zirconia nanoparticles, and
      an average size in a range of about 25 nm to about 35 nm.

2. The gamma radiation shielding material of claim 1, wherein the matrix material exhibits a linear attenuation coefficient of at least 0.457 $cm^{-1}$ at about 0.662 MeV.

3. The gamma radiation shielding material of claim 1, wherein the matrix material has a density in a range of about 5.8 $g/cm^3$ to about 5.97 $g/cm^3$.

4. The gamma radiation shielding material of claim 1, wherein the neodymium-doped zirconia nanoparticles exhibit mixed monoclinic-tetragonal X-ray diffraction phase intensity peaks when the neodymium content is 1.5 mol %.

5. The gamma radiation shielding material of claim 1, wherein the neodymium-doped zirconia nanoparticles exhibit predominantly tetragonal X-ray diffraction phase intensity peaks when the neodymium content is 3.0 mol %.

6. The gamma radiation shielding material of claim 1, wherein the matrix material is configured to attenuate gamma rays generated by a gamma radiation source in an energy range of about 0.059 MeV to about 2.506 MeV.

7. The gamma radiation shielding material of claim 6, wherein a thickness of the matrix material of about 12.5 cm has a lead equivalence of 1 cm of lead.

8. A radiation shield, comprising: the gamma radiation shielding material of claim 6, and a frame configured to hold the matrix material, wherein the frame and matrix material are configured to attenuate gamma radiation in an energy range of about 0.059 MeV to about 2.506 MeV.

9. The gamma radiation shielding material of claim 1, wherein the neodymium-doped zirconia nanoparticles are made by:
   mixing a zirconium oxychloride solution with a neodymium nitrate solution to form a precursor solution;
   chelating the precursor solution;
   forming a sol-gel from the chelated precursor solution by adding a polyvinylpyrrolidone powder dissolved in ethanol;
   adjusting a pH of the sol-gel to about 10.5 by adding a quantity of ammonium hydroxide;
   performing a hydrothermal treatment at about 190° C. for about 24 hours; and
   forming the neodymium-doped zirconia nanoparticles by calcinating the hydrothermally treated sol-gel at a temperature selected from a range of about 600° C. to about 950° C.

10. The gamma radiation shielding material of claim 9, wherein the process further comprises forming the precursor solution by mixing about a 0.1 M zirconium oxychloride solution with a 0.1 M neodymium nitrate solution.

11. The gamma radiation shielding material of claim 9, wherein the process further comprises dispersing a graphene oxide composition into the pH adjusted sol-gel before performing the hydrothermal treatment, wherein the graphene oxide is present in an amount of about 0.5 wt. %, wherein wt. % is based on a total weight of the pH adjusted sol-gel.

12. The gamma radiation shielding material of claim 9, wherein calcinating the hydrothermally treated sol-gel is performed in an atmosphere selected from at least one of air, a mixture of 5% hydrogen gas to nitrogen gas ($H_2/N_2$) and pure nitrogen gas ($N_2$).

13. The gamma radiation shielding material of claim 9, wherein chelating the precursor solution comprises adding acetylacetone to the precursor solution, wherein the acetylacetone is configured to control hydrolysis in the precursor solution.

14. A process for synthesizing neodymium-doped zirconia nanoparticles having a tetragonal crystal structure for use in gamma radiation shielding, comprising:
   forming a precursor solution by mixing a zirconium oxychloride solution with a neodymium nitrate solution;
   adding a chelating agent comprising acetylacetone to the precursor solution, wherein the acetylacetone is configured to control hydrolysis in the precursor solution;
   forming a sol-gel matrix material by adding a polyvinylpyrrolidone powder dissolved in ethanol to the chelated precursor solution;
   adjusting a pH of the sol-gel matrix material to about 10.5 by adding a quantity of ammonium hydroxide;
   dispersing a graphene oxide composition into the pH adjusted sol-gel matrix material, wherein the graphene oxide is present in an amount of about 0.5 wt. %, wherein wt. % is based on a total weight of the pH adjusted sol-gel matrix material;
   performing a hydrothermal treatment at a temperature of about 190° C. for about 24 hours; and
   forming the neodymium-doped zirconia nanoparticles by calcinating the hydrothermally treated sol-gel matrix material at a temperature selected from a range of about 600° C. to about 950° C.

15. The process of claim 14, further comprising:
forming the precursor solution by mixing a 0.1 M zirconium oxychloride solution with a 0.1 M neodymium nitrate solution.

16. The process of claim 14, further comprising:
adjusting a neodymium content of the neodymium nitrate solution to a range of about 1.5 mol % to about 3.0 mol %.

17. The process of claim 14, further comprising:
utilizing an ultrasonic mixer to disperse the graphene oxide composition into the pH adjusted sol-gel matrix material.

18. The process of claim 14, further comprising:
forming a frame configured to hold the calcinated hydrothermally treated sol-gel matrix material; and
forming a radiation shield by inserting the calcinated hydrothermally treated sol-gel matrix material into the frame, wherein the radiation shield is configured to attenuate gamma radiation in an energy range of about 0.059 MeV to about 2.506 MeV.

19. A method of shielding against gamma radiation, comprising:
synthesizing neodymium-doped zirconia nanoparticles, wherein the neodymium-doped zirconia nanoparticles have a tetragonal crystal structure, a neodymium content selected from a range of about 1.5 mol % and about 3.0 mol %, and an average size in a range of about 25 nm to about 35 nm;
forming a matrix material comprising the neodymium-doped zirconia nanoparticles, wherein the neodymium-doped zirconia nanoparticles are dispersed within the matrix material;
forming a frame configured to hold the calcinated hydrothermally treated sol-gel matrix material;
forming a radiation shield by inserting the calcinated hydrothermally treated sol-gel matrix material into the frame; and
placing the radiation shield in front of a gamma radiation source to attenuate the gamma radiation in an energy range of about 0.059 MeV to about 2.506 MeV.

20. The method of claim 19, further comprising synthesizing neodymium-doped zirconia nanoparticles by:
forming a precursor solution by mixing a zirconium oxychloride solution with a neodymium nitrate solution;
adding a chelating agent comprising acetylacetone to the precursor solution, wherein the acetylacetone is configured to control hydrolysis in the precursor solution;
forming a sol-gel matrix material by adding a polyvinylpyrrolidone powder dissolved in ethanol to the chelated precursor solution;
adjusting a pH of the sol-gel matrix material to about 10.5 by adding a quantity of ammonium hydroxide;
dispersing a graphene oxide composition into the pH adjusted sol-gel matrix material, wherein the graphene oxide is present in an amount of about 0.5 wt. %, wherein wt. % is based on a total weight of the pH adjusted sol-gel matrix material;
performing a hydrothermal treatment at a temperature of about 190° C. for about 24 hours; and
forming the neodymium-doped zirconia nanoparticles by calcinating the hydrothermally treated sol-gel matrix material at a temperature selected from a range of about 600° C. to about 950° C.

\* \* \* \* \*